United States Patent
Liu

(10) Patent No.: US 9,951,946 B2
(45) Date of Patent: Apr. 24, 2018

(54) HIGH-EFFICIENCY CLEAN BURNING METHOD AND DEVICE OF MACROMOLECULAR SUBSTANCE

(71) Applicant: Weiqi Liu, Yichun (CN)

(72) Inventor: Weiqi Liu, Yichun (CN)

( * ) Notice: Subject to any disclaimer, the term of this patent is extended or adjusted under 35 U.S.C. 154(b) by 594 days.

(21) Appl. No.: 14/346,683

(22) PCT Filed: Sep. 21, 2012

(86) PCT No.: PCT/CN2012/081714
§ 371 (c)(1),
(2) Date: Jul. 10, 2015

(87) PCT Pub. No.: WO2013/041039
PCT Pub. Date: Mar. 28, 2013

(65) Prior Publication Data
US 2015/0338093 A1    Nov. 26, 2015

(30) Foreign Application Priority Data

Sep. 24, 2011   (CN) .......................... 2011 1 0302766

(51) Int. Cl.
*F23G 5/38*         (2006.01)
*F23G 5/027*        (2006.01)
(Continued)

(52) U.S. Cl.
CPC ............. *F23G 5/38* (2013.01); *F23G 5/0276* (2013.01); *F23G 5/04* (2013.01); *F23G 5/16* (2013.01);
(Continued)

(58) Field of Classification Search
CPC ...... F23G 5/027; F23G 5/0273; F23G 5/0276; F23G 5/38; F23G 5/46; F23G 7/10;
(Continued)

(56) References Cited

U.S. PATENT DOCUMENTS 4,213,404 A * 7/1980 Spaulding ............... F23B 7/005
                                                        110/229
4,459,136 A * 7/1984 Linneborn ................. C10J 3/26
                                                         201/25

FOREIGN PATENT DOCUMENTS

CN         1710023 A     12/2005
CN         1789807 A      6/2006
(Continued)

OTHER PUBLICATIONS

Chinese International Search Report of corresponding International PCT Application No. PCT/CN2012/081714, dated Jan. 3, 2013.

*Primary Examiner* — David J Laux
(74) *Attorney, Agent, or Firm* — J.C. Patents

(57) ABSTRACT

A high-efficiency clean burning method of a macromolecular substance, wherein the macromolecular substance comprises biomass and solid organic waste; the method comprises the following steps: generating a first gaseous substance and a red-hot carbon residue layer from biomass carbon residue or charcoal or coke or a mixture thereof by anoxic combustion; leading the heat generated by anoxic combustion to the macromolecular substance, preheating and drying the macromolecular substance and carrying out pyrolysis gasification, so as to generate a second gaseous substance; taking red-hot carbon residue as a pyrolysis catalyst, leading the second gaseous substance to the red-hot carbon residue layer to carry out oxygen catalytic cracking, so as to generate a third gaseous substance; leading the third gaseous substance and the first gaseous substance to an oxygen-enriched combustion zone in a heat preservation manner to carry out oxygen-enriched combustion, so as to achieve substantial complete combustion of all gasification products, wherein a tar wastewater is not generated, and pollution of smoke tar is not generated. A device capable of achieving the method comprises four categories of a plural- (Continued)

ity of devices. Thus, zero emission of "dioxin" can be achieved when the device is applied to waste incineration disposal.

10 Claims, 16 Drawing Sheets

(51) Int. Cl.
  *F23G 5/16* (2006.01)
  *F23G 5/46* (2006.01)
  *F23G 7/10* (2006.01)
  *F23G 5/04* (2006.01)

(52) U.S. Cl.
  CPC .............. *F23G 5/46* (2013.01); *F23G 7/10* (2013.01); *F23G 2201/303* (2013.01); *F23G 2201/304* (2013.01); *F23G 2201/40* (2013.01); *F23G 2202/101* (2013.01); *F23G 2202/60* (2013.01); *F23G 2206/10* (2013.01); *F23G 2206/203* (2013.01); *F23G 2209/26* (2013.01); *F23G 2900/50002* (2013.01); *Y02E 20/12* (2013.01); *Y02E 20/344* (2013.01)

(58) Field of Classification Search
  CPC .............. F23G 7/105; F23G 2201/30; F23G 2201/303; F23G 2201/40; F23G 2202/10; F23G 2202/105; F23G 2204/101; F23G 2209/26; F23G 2209/261; F23G 2209/262; F23G 2900/50002; Y02E 20/12
  See application file for complete search history.

(56) References Cited

FOREIGN PATENT DOCUMENTS

| | | |
|---|---|---|
| CN | 2786121 Y | 6/2006 |
| CN | 1959206 A | 5/2007 |
| CN | 101113814 A | 1/2008 |
| CN | 201015092 Y | 1/2008 |
| CN | 101216170 A | 7/2008 |
| CN | 101285577 A | 10/2008 |
| CN | 101560401 A | 10/2009 |
| CN | 101781579 A | 7/2010 |
| CN | 101813327 A | 8/2010 |
| CN | 101825293 A | 9/2010 |
| CN | 102168610 A | 8/2011 |
| CN | 102322630 A | 1/2012 |
| JP | 2001-289416 A | 10/2001 |
| JP | 2006-266537 A | 10/2006 |

* cited by examiner

HIGH-EFFICIENCY CLEAN BURNING METHOD AND DEVICE OF MACROMOLECULAR SUBSTANCE

TECHNICAL FIELD

The invention relates to biomass gasification burning method and device, particularly relates to high-efficiency clean burning method and device of a macromolecular substance, and belongs to the technical field of high-efficiency clean burning utilization of a substance.

BACKGROUND ART

The macromolecular substance comprises biomass, solid organic waste and industrial waste such as waste tires and the like, and belongs to a renewable energy substance. How to achieve high-efficiency clean conversion and utilization of the macromolecular substance has been a hot research subject of the science and technology workers around the world.

It is well known that energy utilization of the macromolecular substance at present comprises three modes as follows: 1, a traditional direct combustion utilization mode, which must be washed out because of low thermal efficiency and serious secondary pollution, 2, a liquefaction utilization mode, which still cannot be popularized at present because of large investment, high manufacturing cost, unstable quality, strict material requirements and absence of economical efficiency in comparison with fossil energy, 3, a gasification utilization mode, which comprises two aspects of biomass gasification burning and waste gasification incineration disposal, and is the most realistic and promising energy utilization mode at present. However, the secondary pollution problem of "tar" has not been effectively solved in the aspect of biomass gasification burning, resulting in slow progress of the biomass gasification utilization work in our country. For example, a biomass concentrated air supply device which has been widely promoted in the countryside in China and known as "making a fire by a person and cooking in the whole village", kinds of technological means including high-temperature pyrolysis and catalytic cracking are adopted in treatment of a biomass tar, but the problem of tar pollution is still the main chief culprit of resulting in paralysis of the biomass concentrated air supply device in the end while "waste gasification incineration" is the inevitable course for finally achieving "harmless, recycling and reduction" treatment of the solid organic waste in the aspect of waste gasification incineration disposal, but highly toxic carcinogenic substances such as "dioxin" cannot be avoided in the prior art, so that it is difficult to carry out waste incineration disposal in various countries in the world. It's been shown that the respiratory cancer incidence of all residents around the places in which waste incineration plants are built is increased by about 70 times on the primary base in general, and "dioxin" pollution has become a public hazard of turning pale at the mention of a tiger in various countries in the world. Therefore, the plan of building 137 garbage furnaces had been forced to be concealed by the United States in 1985; 52 garbage furnaces in great lakes in North America were stopped in succession in 1996; the "garbage furnaces banning construction" was also issued by the European Union of Germany, Netherlands, Belgium and the like and Canada in succession. It is not uncommon to hear popular dissatisfaction caused by cancers due to "dioxin" pollution since the birth of the first waste incineration power plant in Guangzhou in August 2000. A project supposed to benefit the nation and the people became a focal point of generating popular discontent due to substandard prior art. In the face of rolling waste to be processed every day, governments at all levels actually enter a dilemma on whether building "waste incineration plants" or not. For eliminating "dioxin", some waste incineration plants are forced to arrange the liquefied gas burning process and recycled circulation combustion process of partial tail gas at its tail gas processing section, which increases the equipment cost and improves the operating cost; and facts proved that the processing effect of the plants were not ideal. The inventor thinks that a common thought mistake mainly exists in the prior art as to "biomass gasification burning" or "waste gasification incineration disposal", namely it is widely believed that the tar pollution problem can be fundamentally solved by as long as the tar macromolecular substances are completely cracked, and the existing biomass gas contains a certain amount of biomass tar due to incomplete tar cracking. For this reason, various tar cracking methods and cracking devices over the years are produced like the chambers, but the tar pollution problems produced during the biomass gasification burning process and the "dioxin" pollution problems produced during waste incineration process still exist, and those problems are not effectively solved. Actually, whatever the "catalytic cracking" or the "high-temperature pyrolysis" or the "nuclear magnetic resonance technology", or whether the tar is completely cracked, not all the "micromolecular substances" produced by cracking the tar macromolecular substances are the micromolecular substances in the stable state, a part of tar macromolecular substances must be organic micromolecular free radicals which include unsaturated bonds and are in an activation state. All the "micromolecular organic free radicals" will be combined to form long-chain molecules and emit the heat once leaving the high-temperature area of cracking reaction, and then form the tar macromolecular substances again. The difference is that the tar macromolecular substances produced secondarily are reduced. For completely switching the tar macromolecular substances to the micromolecular substances in the stable state, we tried to apply the "hydrogenation catalysis cracking technology" which is universally adopted by petrochemical industry to cracking transformation of the biomass gasification tars, we hope to radically resolve the secondary pollution of the "tar" through the "hydrogenation catalysis cracking technology", but the "hydrogenation catalysis cracking technology" needs a lots of harsh reaction conditions, such as a specific catalyst, a hydrogen source, high temperature and high pressure, so that the equipment is expense, the production technology is complicated, the safety coefficients are low, the operation is troublesome, the operation cost is high, and the economical efficiency cannot be compared with the fossil energy. Therefore, the "hydrogenation catalysis cracking technology" does not have big practical value in the high-efficiency clean conversion application of the macromolecular substances.

For example, a combustion method and a combustion device of granular fuel, Invention Patent, China, 200810056512.4, an enough and steady red-hot carbon residue layer cannot be formed; and a large part of pyrolysis gas of the granular fuel is not cracked, and directly enters a "flame combustion zone" over the red-hot carbon residue layer in a form of a tar macromolecule gaseous substance, so the secondary pollution of the smoke and tar is inevitable.

Although a low-$NO_x$ combustion device and a combustion method for biomass, Invention Patent, China, 200410098604.0 have excellent effects in the aspect of reducing $NO_x$ discharge, a large part of pyrolysis gas from a pyrolysis chamber is not cracked, and directly enters the arranged "combustion chamber" through the arranged "communication port" in the form of the tar macromolecule gaseous substance, so the secondary pollution of the smoke and tar is inevitable.

Low-tar biomass gasification method and device, Invention Patent, China, 200510043836.0 and a "three-sectional biomass gasifier", Invention Patent, China, 200720047795.9, a part of micromolecular combustible gas after the biomass pyrolysis gas is cracked at high temperature is unsaturated organic micromolecular free radical, and the micromolecular combustible gas is not the micromolecular substances in the stable state completely; when the micromolecular combustible gas departs from the high-temperature cracking reaction zone, the micromolecular combustible gas is combined to the tar macromolecular substances again, so the tar pollution is inevitable.

A coal mother-son combustion furnace and a coal combustion method for reducing fuel coal pollutant emission, Invention Patent, China, 200610088987.2, adopt a double-furnace structure, and are high in construction cost of equipment, low in automation degree and inconvenient to operate, so the furnace and the method just can be applicable to coal combustion of the manual operation and not applicable to combustion utilization of biomass and solid organic waste with higher moisture content, or else, the smoke and tar pollution will be very serious, or even the furnace cannot normally work.

A low-oxygen high temperature air combustion method and a device thereof, Invention Patent, China, 200610032389.3, can reduce emission of the $NO_x$ and smoke to a certain extent, but the secondary pollution of the smoke and the tar is still inevitable. Above all, when the method and the device are applied to combustion utilization of the biomass and the solid organic waste, the secondary pollution of the smoke and the tar will be more serious.

An "integrated composite gasifier", Invention Patent, China, 200910043224.X, an anoxic combustion zone is a small inverted cone space, so that content is small and easily burnt out, temperature accumulation is difficulty formed and an enough red-hot carbon residue layer is generated. Thus, a primary combustion product from the anoxic combustion zone easily forms incombustible smoke which mainly contains $CO_2$. The pyrolysis gas from "a hearth dry distillation layer and a drying layer" cannot be subjected to catalytic cracking by the red-hot carbon residue layer while most of pyrolysis gas still directly enters an "exhaust cavity" in a form of the tar macromolecular substances, so that a great amount of macromolecular substances enters a "gas stove" together with the gas in a gaseous state, so as to inevitably generate secondary pollution of the tar. Furthermore, just the dry material can be used, if the used material is high in moisture content, the secondary pollution of the smoke and the tar is more serious, or the device cannot normally work.

An user updraft tar-free biomass gasification direct-combustion furnace, Invention Patent, China, 201010152803.0, the biomass is added from the upper part, the tar macromolecular substances in the pyrolysis gas directly enter an oxygen-enriched combustion zone without pyrolysis, so that the secondary pollution of the smoke and the tar will be inevitable. Furthermore, just the dry material can be used, if the used material is high in moisture content, the secondary pollution of the smoke and the tar is more serious, or the furnace cannot normally work.

A method for eliminating a tar wastewater of the gasifier and improving gas generation rate, Invention Patent, China, 201010134070.5, firstly, the biomass in a "gasifier cavity" is easy to form internal empty combustion because of providing of a "reaction chamber" at the center; a lot of tar macromolecular substances, incombustible carbon dioxide and water vapor are generated; the design purpose cannot be achieved just by cracking conversion of the "reaction chamber" at the center; meanwhile, a lot of smoke and tar pollution is certainly generated when the cover needs to be opened to charge; moreover, even if the "reaction chamber" at the center can completely convert the tar gas, the water vapor and the carbon dioxide into the micromolecular combustible gases under the assistance of an internal "electric heater", most of the micromolecular combustible gases are unsaturated organic micromolecular free radicals, and combined with each other to form the tar macromolecular substances after being exported along with "a gas piping", so as to generate the tar pollution. In addition, just the dry material can be used, if the used material is high in moisture content, the secondary pollution of the smoke and the tar will be more serious, or even the gasifier cannot normally work. Therefore, the method is a technical scheme free of any practical value.

In fact, high-efficiency clean burning method and device of a macromolecular substance, which can use the dry material, also can use the wet material, are simple in technology, low in construction cost, stable to operate, convenient to use, fast in ignition speed, small in operating cost, and free of smoke and tar pollution and safe to run and operate, do not generate the tar wastewater, and can achieve zero emission of "dioxin" in the waste incineration disposal process, have energy-efficient and environment-friendly dual effects, and also have obvious comparable economical efficiency in comparison with fossil energy, have not yet been reported in the international scope.

CONTENT OF THE INVENTION

The invention aims at providing high-efficiency clean burning method and device of a macromolecular substance, which can use the dry material, also can use the wet material, are simple in technology, low in construction cost, stable to operate, convenient to use, fast in ignition speed, small in operating cost, and free of smoke and tar pollution and safe to run and operate, do not generate the tar wastewater, and can achieve zero emission of "dioxin" in the waste incineration disposal process, have energy-efficient and environment-friendly dual effects, and also have obvious comparable economical efficiency in comparison with fossil energy aiming at the defects of the prior art.

In Order to Achieve the Purpose, the Invention Adopts the Technical Scheme as Follows:

A high-efficiency clean burning method of a macromolecular substance, the method comprises the steps of:

(1), adding a certain amount of biomass carbon residue to a first combustion air to carry out anoxic combustion below the theoretical oxygen demand, so as to generate a first gaseous substance, fly ashes and a red-hot carbon residue layer, wherein the first gaseous substance mainly comprises carbon monoxide, hydrogen and nitrogen; the first gaseous substance and the fly ashes are in an electronic excited state;

(2), leading the heat generated by anoxic combustion to the macromolecular substance, preheating and drying the macromolecular substance, separating a part of water to increase the reaction temperature and promote pyrolysis gasification, so as to generate a second gaseous substance and carbon residue, wherein the second gaseous substance comprises "dioxin" and/or other "tar" macromolecular substances, a part of micromolecular combustible gas and a small amount of water vapor;

(3), taking red-hot carbon residue as a pyrolysis catalyst, leading the second gaseous substance to the red-hot carbon residue layer to carry out oxygen catalytic cracking, so as to generate a third gaseous substance and fly ashes, wherein the third gaseous substance does not contain "dioxin" and/or other "tar" macromolecular substances, but contains a certain amount of micromolecular hydrocarbon, carbon monoxide, hydrogen, nitrogen and a part of organic micromolecular free radicals; the third gaseous substance and the fly ashes are in the electronic excited state;

(4), merging and mixing the third gaseous substance and the fly ashes in the electronic excited state in the step (3) with the first gaseous substance and the fly ashes in the step (1), and leading into an oxygen-enriched combustion zone in a heat preservation manner; adding a second combustion air above the theoretical oxygen demand to carry out oxygen-enriched combustion or simultaneously carry out heat recovery; or merging and mixing the third gaseous substance and the fly ashes in the step (3) with the first gaseous substance and the fly ashes in the step (1), leading into the oxygen-enriched combustion zone in the heat preservation manner after dust removal in the heat preservation manner, adding the second combustion air above the theoretical oxygen demand to carry out oxygen-enriched combustion or simultaneously carry out heat recovery, so as to control the temperature of a combustion product above melting points of the fly ashes, or control the temperature of the combustion product above the melting points of the fly ashes and below the generation temperature of a thermal nitric oxide $NO_x$, thereby generating a slag and a fourth gaseous substance, wherein the fourth gaseous substance is also in the electronic excited state;

The situation that the first gaseous substance and the third
   gaseous substance are completely burnt, and a lot of fly
   ashes or a lot of $NO_x$ and fly ashes are not generated in the
   step (4);

(5), directly discharging the fourth gaseous substance into the atmosphere or discharging the fourth gaseous substance into the atmosphere after washing and purifying and/or heat recovery.

"preheating and drying the macromolecular substance and separating a part of water" in the step (2) are as follows:

most of water contained in the macromolecular substance is directly discharged into the atmosphere after being subjected to decalescence gasification and separated from a material in a form of water vapor;

or vaporized water mixed with the micromolecular combustible gas is led into the oxygen-enriched combustion zone in the step (4) after being separated from the material in the form of the water vapor, so as to achieve decalescence cooling and automatic separation of the water vapor and instant complete combustion of the micromolecular combustible gas;

or the vaporized water mixed with the micromolecular combustible gas is led into the oxygen-enriched combustion zone in the step (4) after being separated from the material in the form of the water vapor and fully premixed with a third combustion air above the theoretical oxygen demand, so as to achieve gas conversion and decalescence cooling of the water vapor and instant complete combustion of the micromolecular combustible gas;

or the vaporized water mixed with the micromolecular combustible gas is fully premixed with the third combustion air above the theoretical oxygen demand after being separated from the material in the form of the water vapor, and condensed, liquefied and automatically separated by the water vapor, and then led into the oxygen-enriched combustion zone in the step (4), so as to achieve gas conversion and decalescence cooling of a small amount of water vapor, and instant complete combustion of the micromolecular combustible gas.

The situation that "the third gaseous substance does not contain 'dioxin' and other 'tar' macromolecular substances" in the step (3) is achieved by controlling the temperature of the red-hot carbon residue layer and the standing time of the second gaseous substance in the red-hot carbon residue layer, or controlling the amount of the first combustion air, the effective thickness of the red-hot carbon residue layer and the moisture content of the second gaseous substance; the effective thickness of the red-hot carbon residue layer is the carbon residue thickness of which the second gaseous substance actually flows inside the red-hot carbon residue layer; meanwhile, the "dioxin" in the step (2) or the step (3) comprises "dioxin" and a precursor thereof;

The situation that "the first gaseous substance and the third gaseous substance are completely burnt" in the step (4) is achieved by controlling the supply of the second combustion air, namely an excess air coefficient of the second combustion air and the mixing degree of the first gaseous substance, the third gaseous substance and the second combustion air; meanwhile, the situation that "a lot of fly ashes or a lot of $NO_x$ and fly ashes are not generated" in the step (4) is achieved by controlling the temperature of the combustion product of the oxygen-enriched combustion zone; the temperature of the red-hot carbon residue layer in the step (1) or step (2) is greater than or equal to 850 DEG C.; meanwhile, the "heat recovery" in the step (4) is direct heat recovery of filling mixed water vapor to the oxygen-enriched combustion zone and/or indirect heat recovery carried out by virtue of a dividing wall-type heat exchanger;

The "water" in "washing and purifying" in the step (5) comprises common running water, an acid aqueous solution, an alkaline solution or a saline solution.

In addition, judgment whether the supply of the third combustion air and/or the second combustion air are/is appropriate or not also can be based on whether the oxygen-enriched combustion realizes flame-free or short-flame combustion or not and black smoke is generated or not.

A high-efficiency clean burning device of a macromolecular substance, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device and a primary combustion product outlet are arranged on the anoxic combustion chamber; a dust removal chamber is arranged at the primary combustion product outlet; the oxygen-enriched combustion chamber is arranged on the dust removal chamber; a secondary oxygen supply device is arranged on a gas circuit from the primary combustion product outlet to the oxygen-enriched combustion chamber; an ash chamber is arranged below the anoxic combustion chamber; a heat energy collector is arranged inside the oxygen-enriched combustion chamber and/or on the oxygen-enriched combustion chamber; the pyrolysis chamber and the drying chamber are sequentially arranged above the anoxic combustion chamber; thermal-insulating layers are arranged at the peripheries of the outer sides of the dust removal chamber, the anoxic combustion chamber, the pyrolysis chamber and the drying chamber. A "water vapor separation discharge device" is one or combination of two of "a water vapor condensation and liquefaction separation device", "an open feeding hopper", "a feeding hopper with a control valve", "a single air duct", "an air duct with a control valve" and "a control valve and an oxygenating tube with the control valve simultaneously arranged on the air duct".

A high-efficiency clean burning device of the macromolecular substance, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device is arranged on the anoxic combustion chamber; a grid melter, a primary combustion product outlet, the oxygen-enriched combustion chamber and an ash chamber are sequentially arranged below the anoxic combustion chamber; a secondary combustion product outlet is formed on the oxygen-enriched combustion chamber; meanwhile, a secondary oxygen supply device is arranged on the grid melter and/or a gas circuit from the primary combustion product outlet to the oxygen-enriched combustion chamber; the pyrolysis chamber and the drying chamber are sequentially arranged above the anoxic combustion chamber; the drying chamber, the pyrolysis chamber, the anoxic combustion chamber, the oxygen-enriched combustion chamber and the ash chamber are communicated; thermal-insulating layers are arranged at the peripheries of the outer sides of the drying chamber, the pyrolysis chamber, the anoxic combustion chamber, the oxygen-enriched combustion chamber and the ash chamber; or meanwhile, heat energy collectors are arranged at one or more parts "on the drying chamber, the pyrolysis chamber, the anoxic combustion chamber, the oxygen-enriched combustion chamber and the ash chamber and inside the oxygen-enriched combustion chamber and on the secondary combustion product outlet". The drying chamber, the pyrolysis chamber, the anoxic combustion chamber, the oxygen-enriched combustion chamber and the ash chamber are communicated; the thermal-insulating layers are arranged at the peripheries of the outer sides of the drying chamber, the pyrolysis chamber, the anoxic combustion chamber, the oxygen-enriched combustion chamber and the ash chamber; or meanwhile, the heat energy collectors are arranged at one or more parts "on the drying chamber, the pyrolysis chamber, the anoxic combustion chamber, the oxygen-enriched combustion chamber and the ash chamber and inside the oxygen-enriched combustion chamber and on the secondary combustion product outlet". The "water vapor separation discharge device" is one or combination of two of "a water vapor condensation and liquefaction separation device", "an open feeding hopper", "a feeding hopper with a control valve", "a single air duct", "an air duct with a control valve" and "a control valve and an oxygenating tube with the control valve simultaneously arranged on the air duct".

A high-efficiency clean burning device of the macromolecular substance, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device is arranged on the anoxic combustion chamber; a grid melter, a primary combustion product outlet, the oxygen-enriched combustion chamber and a washing dust chamber are sequentially arranged below the anoxic combustion chamber; a secondary combustion product outlet is formed on the oxygen-enriched combustion chamber; the secondary combustion product outlet is arranged below the liquid level of the washing dust chamber; meanwhile, a secondary oxygen supply device is arranged on the grid melter and/or a gas circuit from the primary combustion product outlet to the oxygen-enriched combustion chamber; the pyrolysis chamber and the drying chamber are sequentially arranged above the anoxic combustion chamber; the drying chamber, the pyrolysis chamber, the anoxic combustion chamber, the oxygen-enriched combustion chamber and the washing dust chamber are communicated; thermal-insulating layers are arranged at the peripheries of the outer sides of the drying chamber, the pyrolysis chamber, the anoxic combustion chamber and the oxygen-enriched combustion chamber; meanwhile, a mixed water vapor outlet is formed on the washing dust chamber; a scrubber tower is arranged on the mixed water vapor outlet; heat energy collectors are arranged at one or more parts on the scrubber tower, the drying chamber, the pyrolysis chamber, the anoxic combustion chamber and the oxygen-enriched combustion chamber and inside the oxygen-enriched combustion chamber. The "water vapor separation discharge device" is one or combination of two of "a water vapor condensation and liquefaction separation device", "an open feeding hopper", "a feeding hopper with a control valve", "a single air duct", "an air duct with a control valve" and "a control valve and an oxygenating tube with the control valve simultaneously arranged on the air duct".

A high-efficiency clean burning device of the macromolecular substance, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device is arranged on the anoxic combustion chamber; a primary combustion product outlet and the oxygen-enriched combustion chamber are sequentially arranged above the anoxic combustion chamber; a secondary oxygen supply device is arranged on the primary combustion product outlet and/or a gas circuit from the primary combustion product outlet to the oxygen-enriched combustion chamber; the pyrolysis chamber, the drying chamber and a feeder are sequentially arranged below the anoxic combustion chamber; the oxygen-enriched combustion chamber, the anoxic combustion chamber, the pyrolysis chamber and the drying chamber are communicated; heat energy collectors arranged at one part on the drying chamber, the pyrolysis chamber, the anoxic combustion chamber and the oxygen-enriched combustion chamber and inside the oxygen-enriched combustion chamber; thermal-insulating layers are arranged at the peripheries of the outer sides of the anoxic combustion chamber, the pyrolysis chamber and the drying chamber. Meanwhile, the water vapor separation discharge device led to the atmosphere and/or the oxygen-enriched combustion chamber is arranged on the drying chamber. The "water vapor separation discharge device" is one or combination of two of "a water vapor condensation and liquefaction separation device", "an open feeding hopper", "a feeding hopper with a control valve", "a single air duct", "an air duct with a control valve" and "a control valve and an oxygenating tube with the control valve simultaneously arranged on the air duct".

A high-efficiency clean burning device of the macromolecular substance for achieving the method according to claim 1, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that the anoxic combustion chamber is a slant combustion chamber; a primary oxygen supply device is arranged on the slant combustion chamber; a primary combustion product outlet and the oxygen-enriched combustion chamber are sequentially arranged above the slant combustion chamber; a secondary oxygen supply device is arranged at the primary combustion product outlet; the pyrolysis chamber, the drying chamber and a feeder are sequentially arranged at one side which is horizontally opposite to the upper surface of an oblique base plate of the slant combustion chamber; the oxygen-enriched combustion chamber, the anoxic combustion chamber, the pyrolysis chamber and the drying chamber are communicated; heat energy collectors arranged at one part on the drying chamber, the pyrolysis chamber, the anoxic combustion chamber and the oxygen-enriched combustion chamber and inside the oxygen-enriched combustion chamber; thermal-insulating layers are arranged at the peripheries of the outer sides of the anoxic combustion chamber, the pyrolysis chamber and the drying chamber. Meanwhile, the water vapor separation discharge device led to the atmosphere and/or the oxygen-enriched combustion chamber is arranged on the drying chamber. The "water vapor separation discharge device" is one or combination of two of "a water vapor condensation and liquefaction separation device", "an open feeding hopper", "a feeding hopper with a control valve", "a single air duct", "an air duct with a control valve" and "a control valve and an oxygenating tube with the control valve simultaneously arranged on the air duct".

Description:

$NO_x$ is one of main pollutants of generating photochemical smog, forming acid rain and causing water and atmospheric pollution; and the $NO_x$ floating in the air not only can damage a plant, but also has a toxic effect on an animal. Therefore, the inventor also strives to avoid or reduce secondary pollution of the $NO_x$ as much as possible besides ensuring achievement of all purposes of the invention when a concrete device for achieving the method is proposed. Therefore, in order to well know about all contents of the invention, descriptions of the $NO_x$ and related conditions are as follows:

commonly referred $NO_x$ mainly comprises nitric oxide (NO), nitrogen dioxide ($NO_2$) and nitrous oxide ($N_2O$); NO in most of $NO_x$ generated in the substance combustion process accounts for over about 90%, $NO_2$ accounts for 5-10% while $N_2O$ just accounts for 1%. There are three generation methods: firstly, fuel $NO_x$ prepared from a nitrogenous compound in the fuel in a combustion process in an oxidation manner is a main source of the $NO_x$, and can be up to 90% of total $NO_x$ because of difference of fuels; secondly, the thermal $NO_x$ generated from nitrogen in air stopping for a minute in a high-temperature aerobic environment of over 1500 DEG C. is a second large source of the $NO_x$; thirdly, the fast $NO_x$, which is quickly generated from the nitrogen in air in a high-temperature aerobic environment of 1170-1460 DEG C. under the premise of participation of the organic CH free radicals is a secondary source of the $NO_x$, and accounts for below about 5% of the total $NO_x$.

The Function Mechanism for Realizing High-Efficiency Clean Burning Utilization of the Macromolecular Substances Efficiently Employing the Method is as Follows:

firstly, incomplete combustion of biomass carbon residue or charcoal or coke or a mixture thereof belongs to out-phase surface diffusive combustion. A covalence bond of an $O_2$ molecule has the lowest energy which is just 146.7 kJ/mol and much smaller than 467 kJ/mol of an H—O bond in an $H_2O$ molecule, 436 kJ/mol of an H—H bond in an H2 molecule and 347 kJ/mol of a C—C bond and 413 kJ/mol of a C—H in an organic compound molecule. The chemical property of oxygen is active, so an O—O bond of the $O_2$ molecule can instantaneously crack and generate lots of oxygen radicals under the thermal action of an ignition source; a part of oxygen radicals directly participate into chemical reaction at the carbon residue surface near a fire source, strongly collides with active carbon atoms in an electronic excitation state because of the thermal action of the ignition source. The oxygen radicals at the carbon residue surface are high in concentration, so that $CO_2$ and fly ashes can be instantaneously generated and heat is emitted at the carbon at the carbon residue surface near the ignition source. The carbon residue is high in porosity, large in specific surface area and low in moisture content, so that temperature accumulation can be instantaneously formed at the carbon residue part near the fire source; surface high temperature of 1,000-1,200 DEG C. can be generated. On one hand, the fly ashes near an oxygen injection opening become slag and are automatically separated from the combustion product, and on the other hand, the carbon residue inside the overall anoxic combustion chamber quickly becomes the red-hot carbon residue layer, resulting in a lot of active carbon atoms in a free state generated inside carbon residue pores due to chain reaction under the high-temperature action, and these active carbon atoms strongly collide with another part of oxygen radicals entering from the carbon residue surface. The oxygen radicals inside the carbon residue pores are low in concentration, so that the strong collision result with the oxygen radicals finally escape from the carbon residue surface in a form of the CO molecule. In the same way, the carbon residue is high in porosity and large in specific surface area, so that the quantity of the CO molecules escaping from the carbon residue surface within unit time is much greater than the quantity of $CO_2$ molecules which are directly generated from the carbon residue surface near the oxygen injection opening. In addition, the $CO_2$ molecules generated at the carbon residue surface, a part of fuel $NO_x$ which may be generated by fuel combustion, and a few of $H_2O$ molecules entering along with the combustion air are subjected to reduction reaction together with hot carbon residue in a reducing atmosphere of the red-hot carbon residue, and finally restored into CO, $H_2$ and $N_2$ by a series of complicated chemical processes. Therefore, enough micromolecular combustion gas can be instantaneously produced when the biomass carbon residue or the charcoal or the coke or the mixture thereof disclosed by the invention is not completely combusted, and the red-hot carbon residue layer is formed. Therefore, the device has the advantages of being fast in ignition speed, free of dust in start, and the like, and the fuel $NO_x$ can be effectively prevented.

Meanwhile, bound water and free water in the macromolecular substances begin to get rid of constraint of van der Waals interaction force, so as to escape in a gasification manner under the effect of the heat generated by anoxic combustion of the carbon residue. When the temperature is not greater than 100 DEG C., the macromolecular substances mainly release the water vapor outside, and the macromolecular substances are quickly heated after most of bound water and free water are gasified to escape. When the temperature is about 160 DEG C., the micromolecular substances combined into the macromolecular substances by the hydrogen bonds and van der Waals interaction force begin to get rid of constraints of van der Waals interaction force and hydrogen bonds thereof so as to escape in the gasification manner. After the temperature ascends to 200 DEG C., the macromolecular substances begin to crack, and weak bonds begin to crack. When the temperature ascends to 400-500 DEG C., macromolecular substances are completely cracked into unsaturated organic macromolecular monomer compounds and a part of micromolecular hydrocarbon, so as to generate a lot of pyrolysis gas containing the tar macromolecular gaseous substance, a part of micromolecular combustible gas and a little of water vapor, wherein the pyrolysis gas comprises phenols, acetic acid, methanol, methane, hydrogen, carbon monoxide and the like. At this point, the obtained pyrolysis gas is not led into a combustor or led into the combustor after being condensed and purified in the invention while the pyrolysis gas is led to the red-hot carbon residue layer above 850 DEG C. in a heat preservation manner; "oxygen catalytic cracking" is carried out by taking high-temperature carbon residue as a pyrolysis catalyst, so that unsaturated organic macromolecular monomer compounds, namely strong bonds in the tar macromolecular gaseous substance are compelled to quickly crack, and are completely converted into the organic micromolecular free radicals, wherein one part of the organic micromolecular free radicals are combined with hydrogen atoms to form the micromolecular hydrocarbon in the stable state; another part of organic micromolecular free radicals act together with oxygen atoms in the reducing atmosphere with enough carbon source, and are finally converted into CO and H2 by a series of complicated chemical reaction; the other part of organic micromolecular free radicals exist in the form of the organic micromolecular free radicals. The "oxygen catalytic cracking" product contains a certain amount of organic micromolecular free radicals, which are in an electronic excitation state; these micromolecular free radicals are combined with each other to form a long-chain molecule and emit heat once departing from a high temperature zone of cracking reaction, so as to form the tar macromolecular substances again. Therefore, the micromolecular free radicals are not directly led to a low-temperature air tank to store for use as the micromolecular combustible gas in the stable state completely or led to the combustor by using a common condensation guide device, and are led to the oxygen-enriched combustion zone in a heat preservation manner or led to the oxygen-enriched combustion zone in the heat preservation manner after dust removal in the heat preservation manner, and the combustion air is added above the theoretical oxygen demand to carry out oxygen-enriched combustion. All combustible mixed gases led to the oxygen-enriched combustion zone in the heat preservation manner are micromolecular combustible gases or organic micromolecular free radicals in the electronic excitation state; the micromolecular combustible gases and the organic micromolecular free radicals directly generate oxidation-combustion reaction together with the oxygen radicals free of secondary cracking of the tar macromolecular substances in the oxygen-enriched combustion zone. Therefore, complete combustion is easily achieved under the oxygen-enriched condition. Thus, the bad condition that the organic micromolecular free radicals are secondarily combined to form the tar macromolecular substances in the low-temperature air tank or the common condensation guide device is effectively avoided, and efficient and clean conversion utilization of the macromolecular substances is achieved. "Dioxin" and a precursor thereof belong to the tar macromolecular substances, so that zero emission of "dioxin" can be achieved when the device is applied to power generation by waste incineration.

Compared with the Prior Art, the Device Disclosed by the Invention has the Functions and Advantages as Follows:

The device can utilize a dry material, and also can utilize a wet material. Thus, the device is simple in technology, low in construction cost, stable to operate, convenient to use, fast in ignition speed, low in operating cost, free of smoke and tar pollution, and does not generate the tar wastewater. Zero emission of "dioxin" can be achieved in waste incineration disposal process. The device has energy-efficient and environment-friendly dual effects.

Compared with fossil energy, the invention has obvious comparable economical efficiency, and the operation is very safe.

DESCRIPTION OF FIGURES

The FIG. 1, the FIG. 2 and the FIG. 3 are internal structure diagrams of the first, second and third concrete implementation schemes, and are three concrete implementation schemes in the first class of implementation schemes disclosed by the invention;

the FIG. 4 and the FIG. 5 are internal structure diagrams of "a charcoal fire igniter" disclosed by the invention; the FIG. 5 is a top view; the FIG. 4 is an A-A section view of the FIG. 5, but section lines are not completely labeled in the figures;

Figure 1:
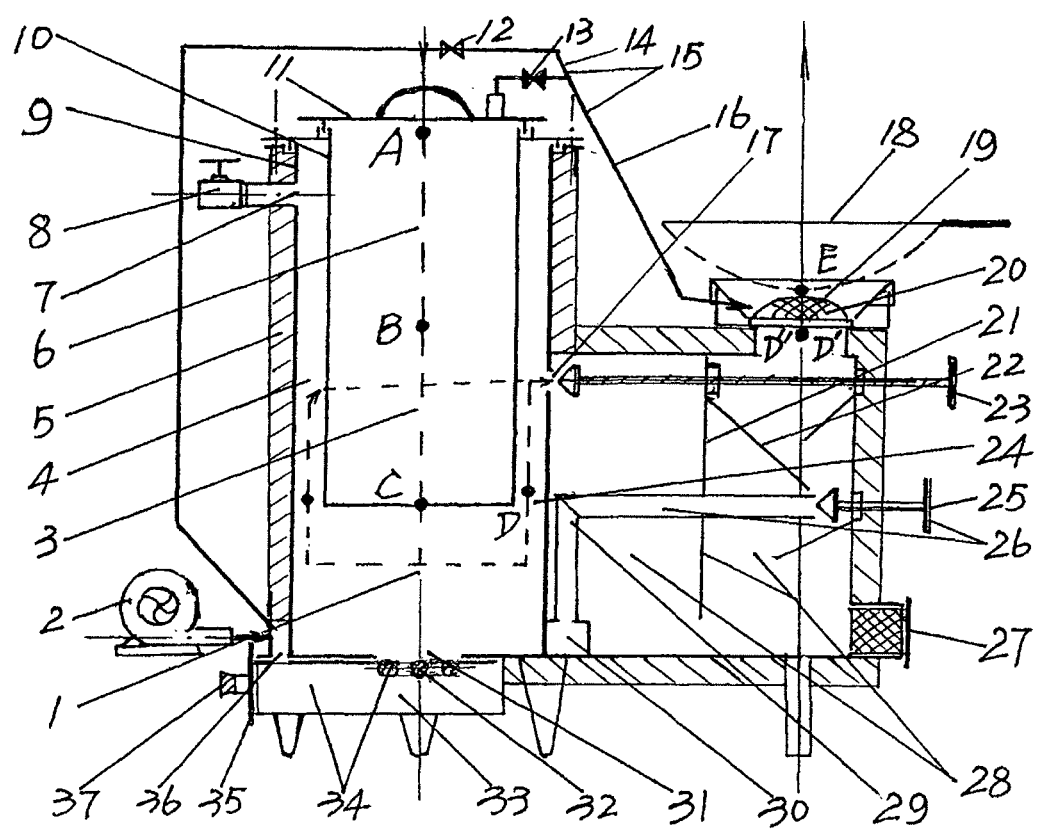
Figure 3:
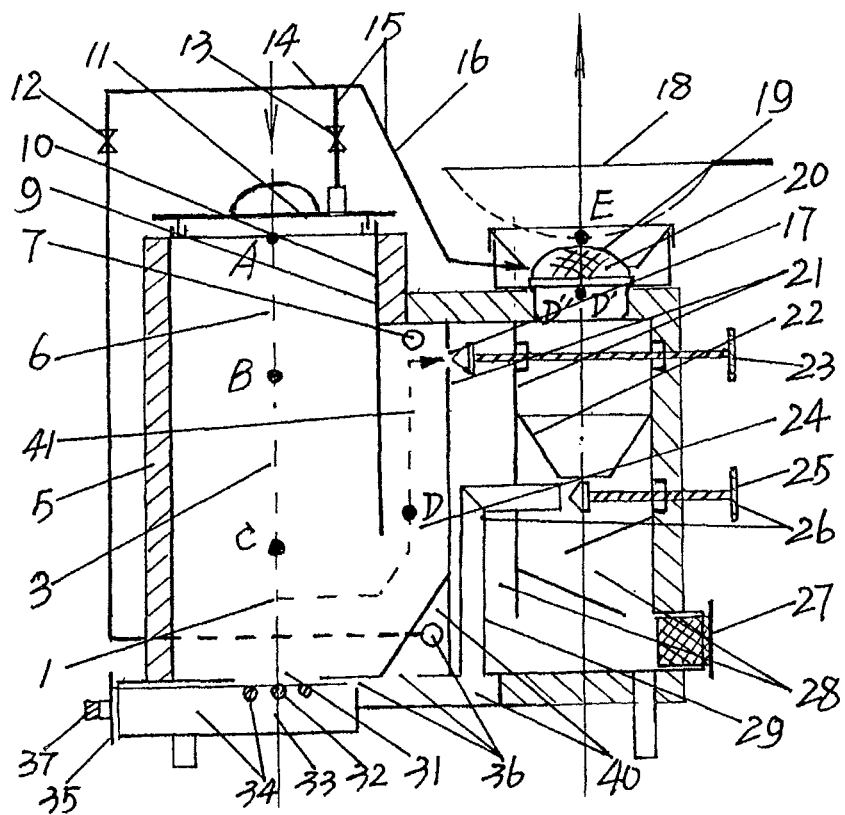
Figure 4:
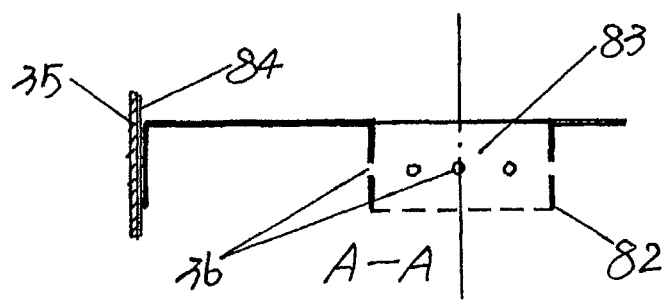
Figure 5:
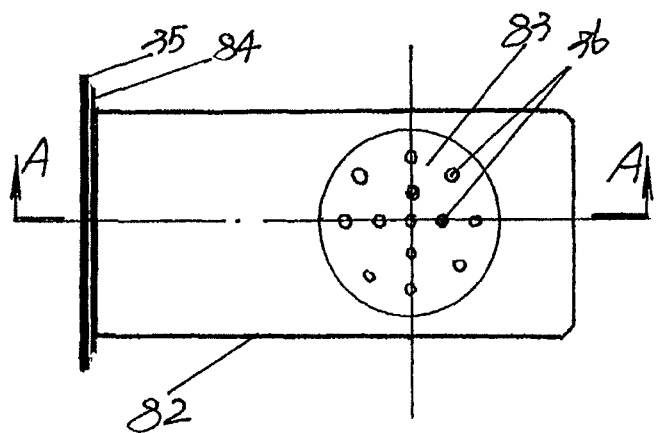
Figure 6:
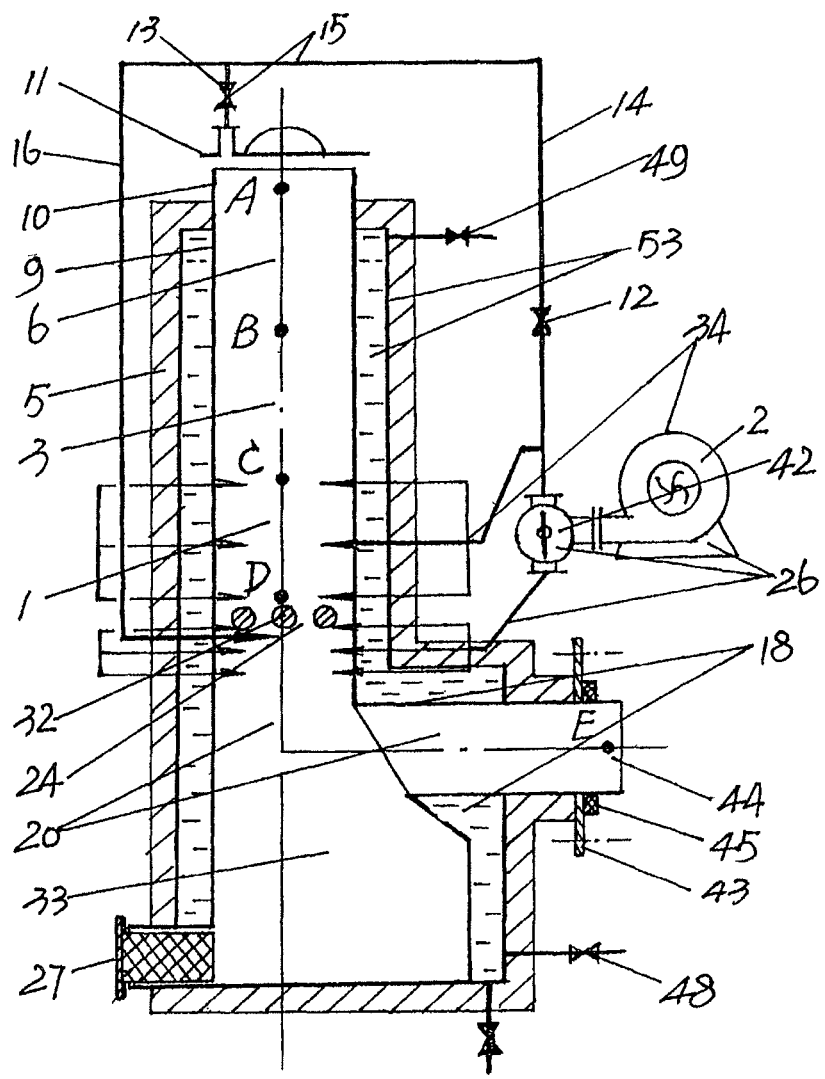
Figure 7:
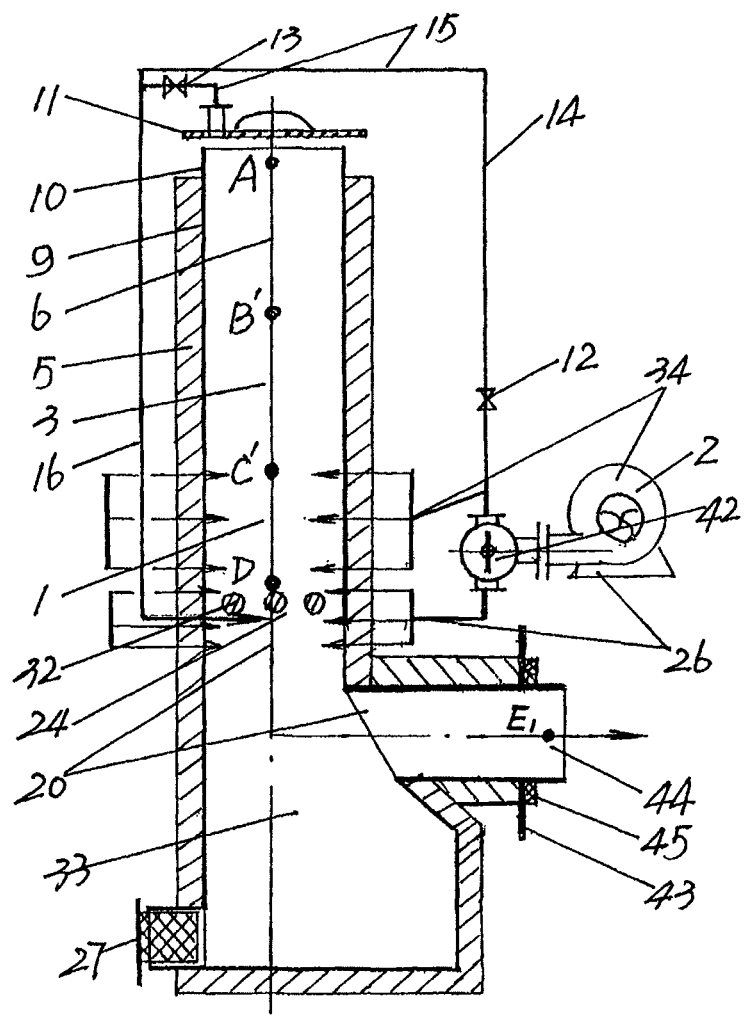
Figure 8:
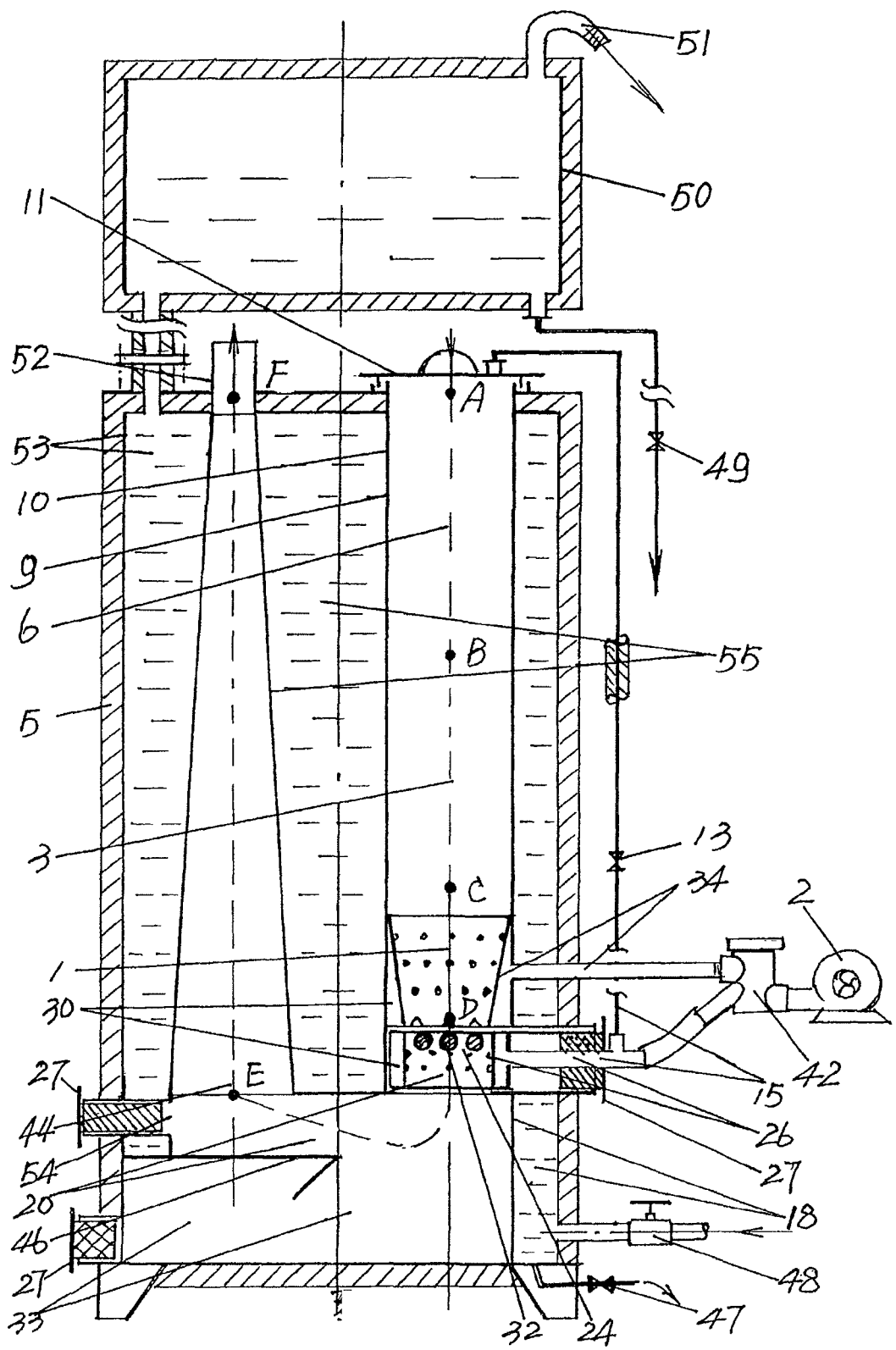
Figure 9:
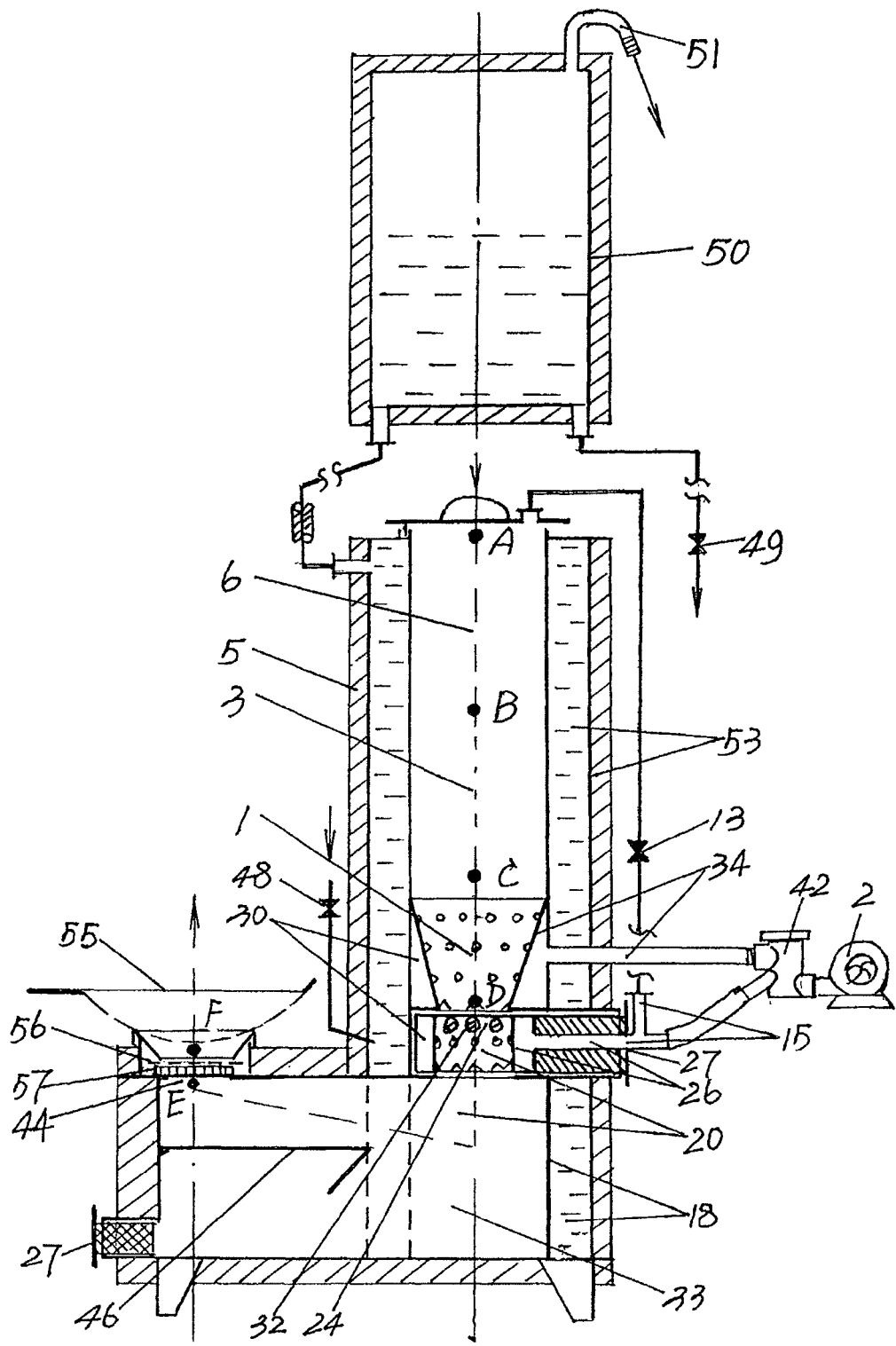
Figure 10:
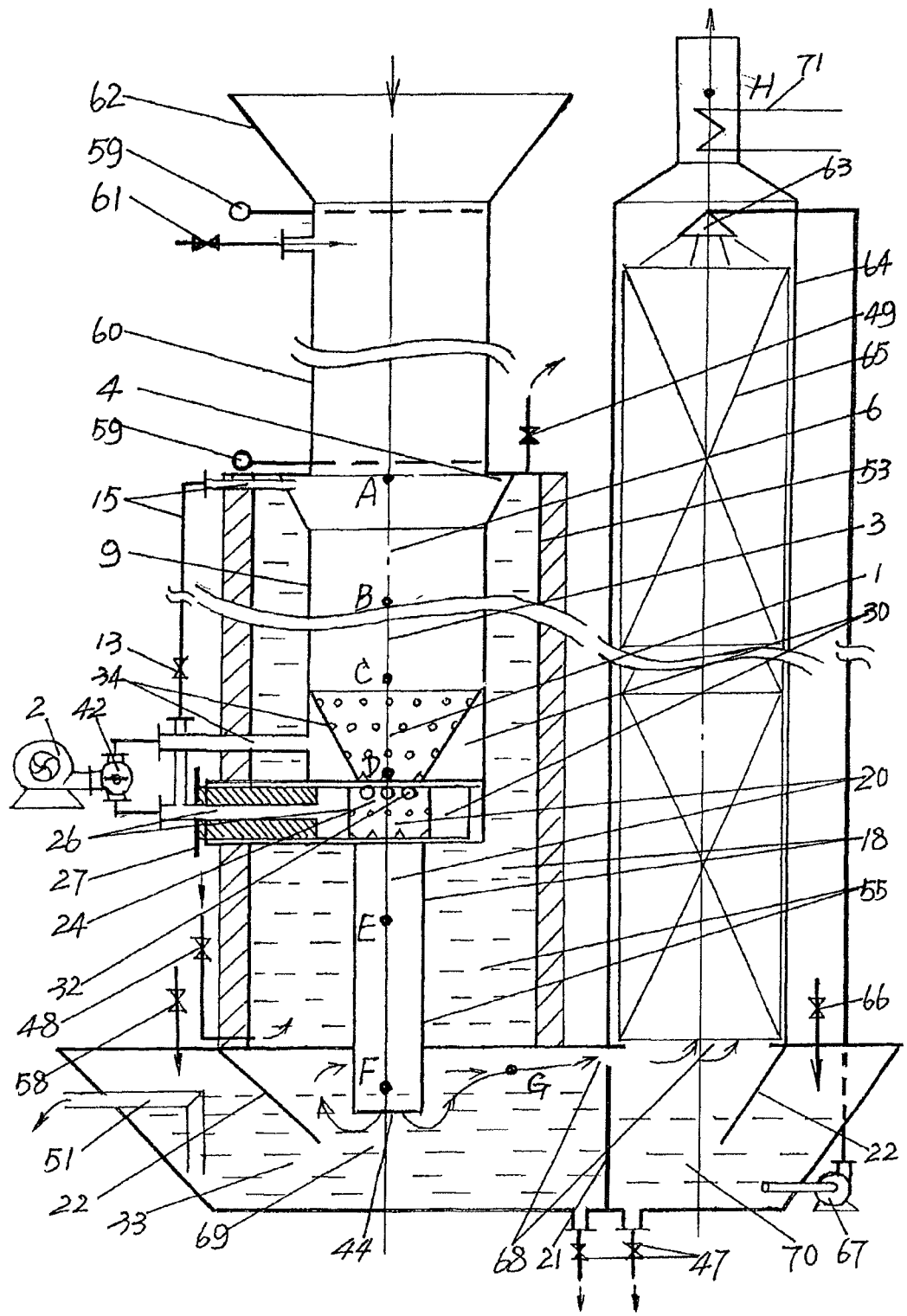
Figure 11:
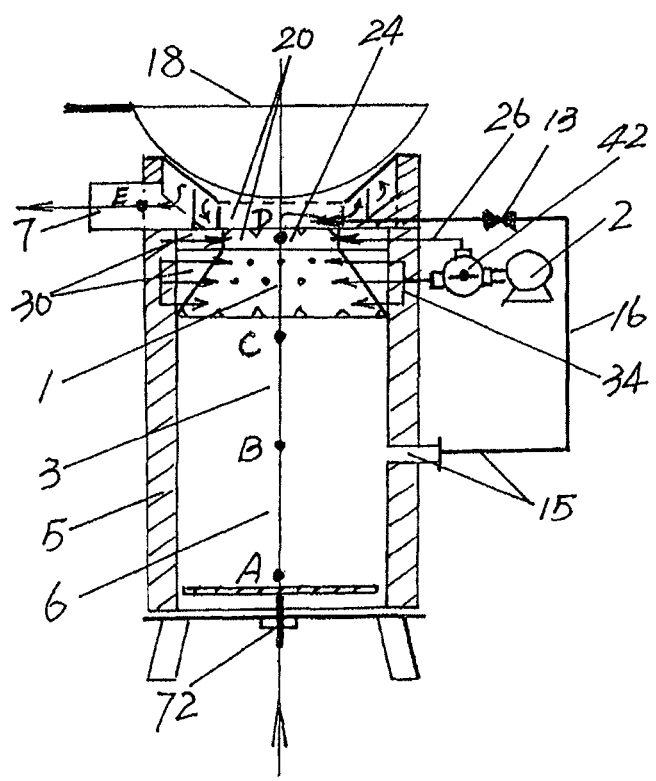
Figure 12:
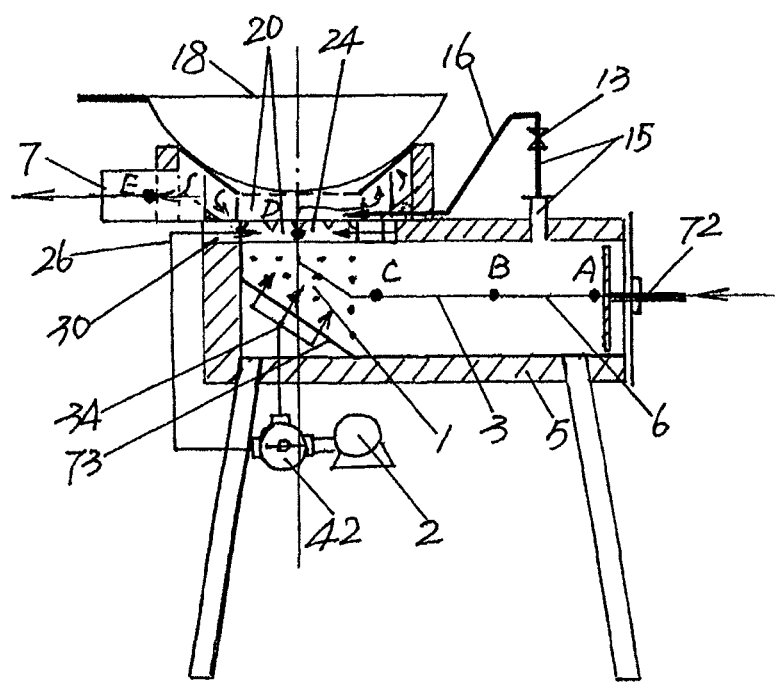
Figure 13:
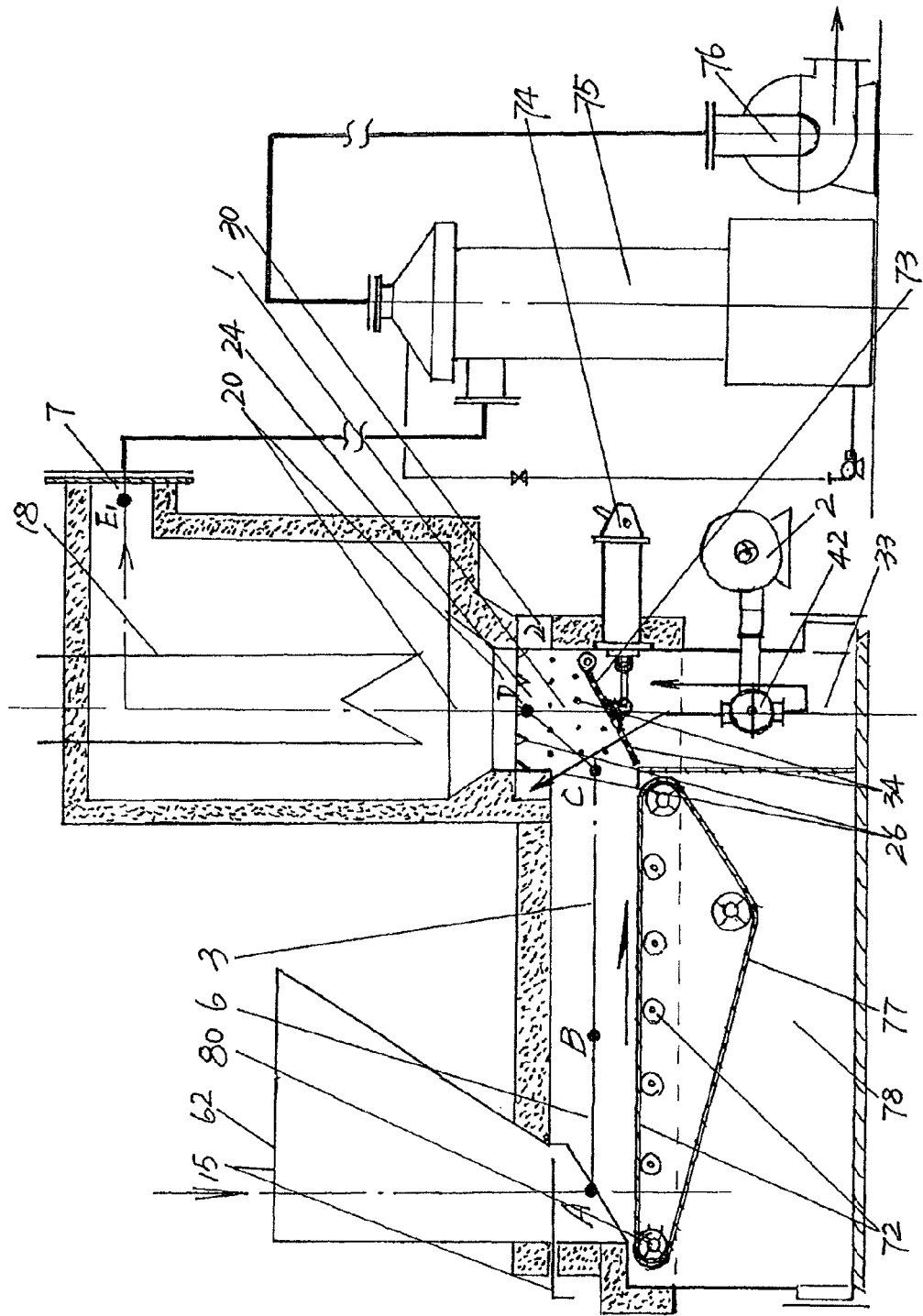
Figure 14:
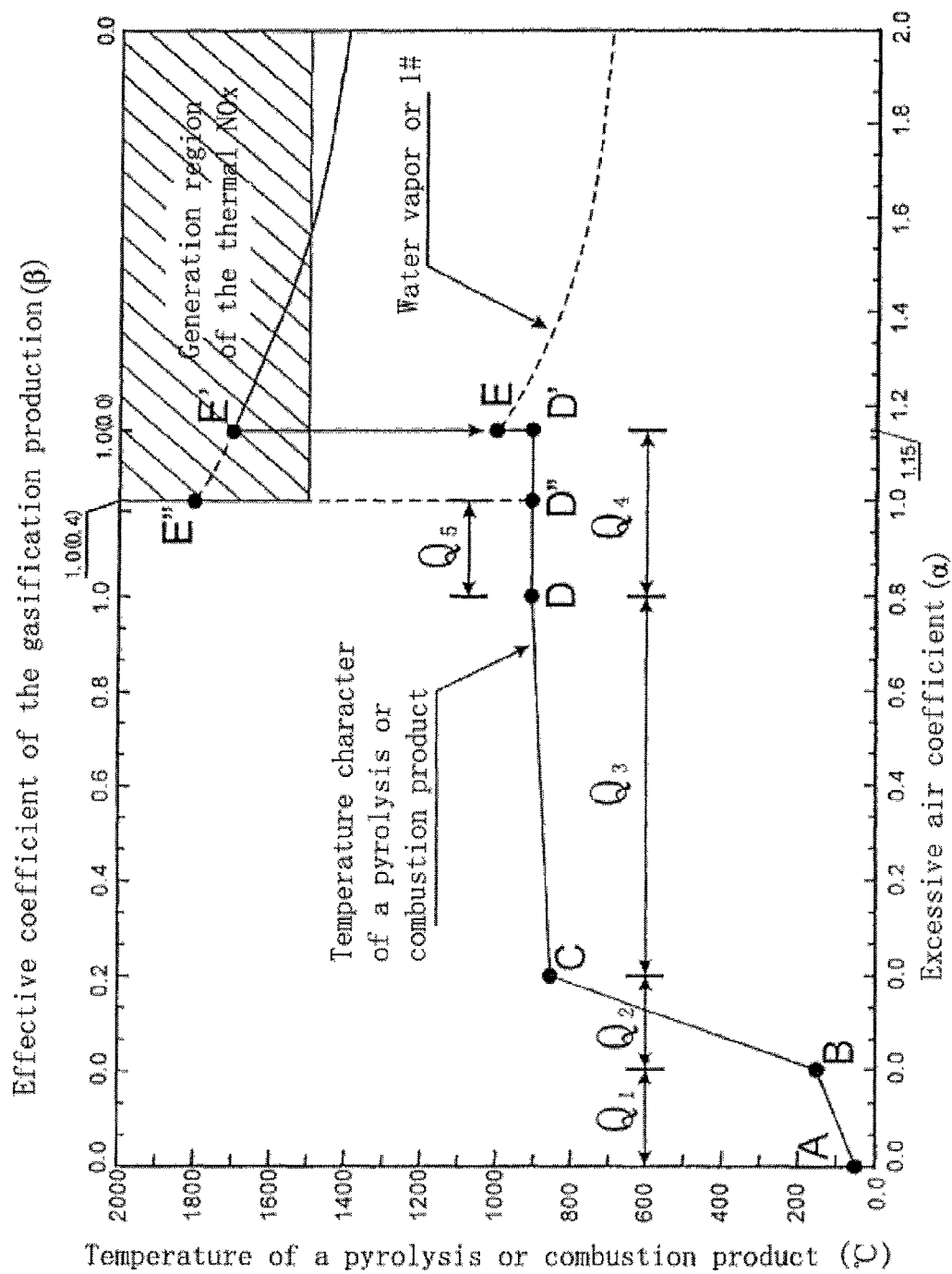
Figure 15:
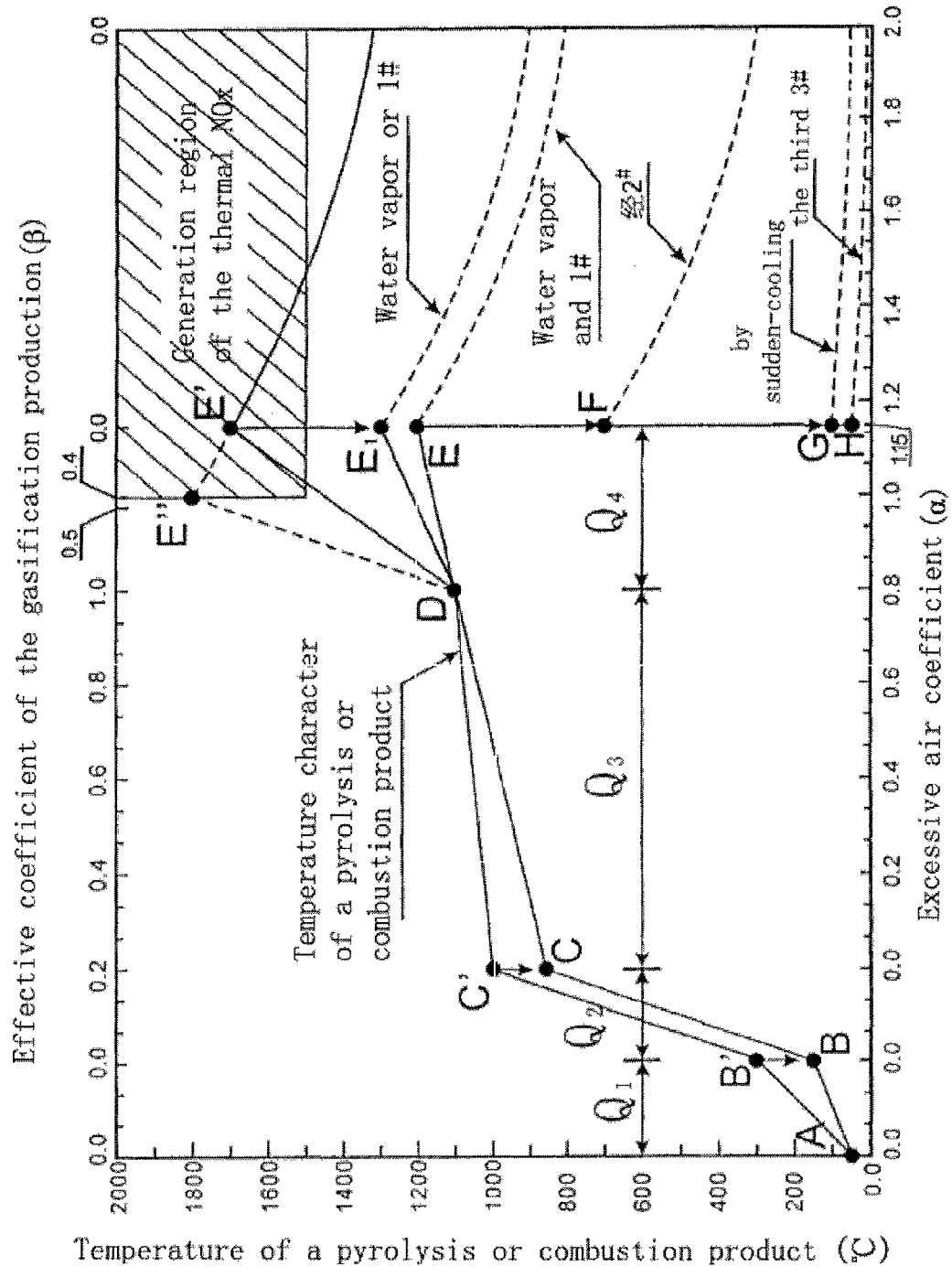
Figure 16:
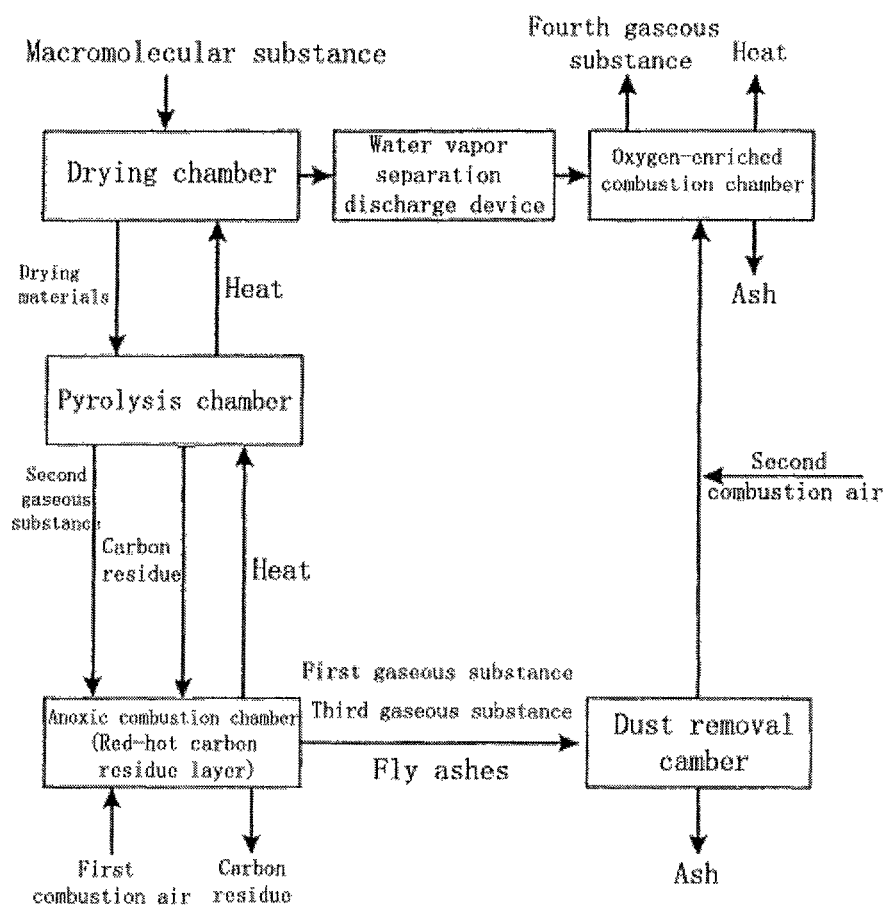
Figure 17:
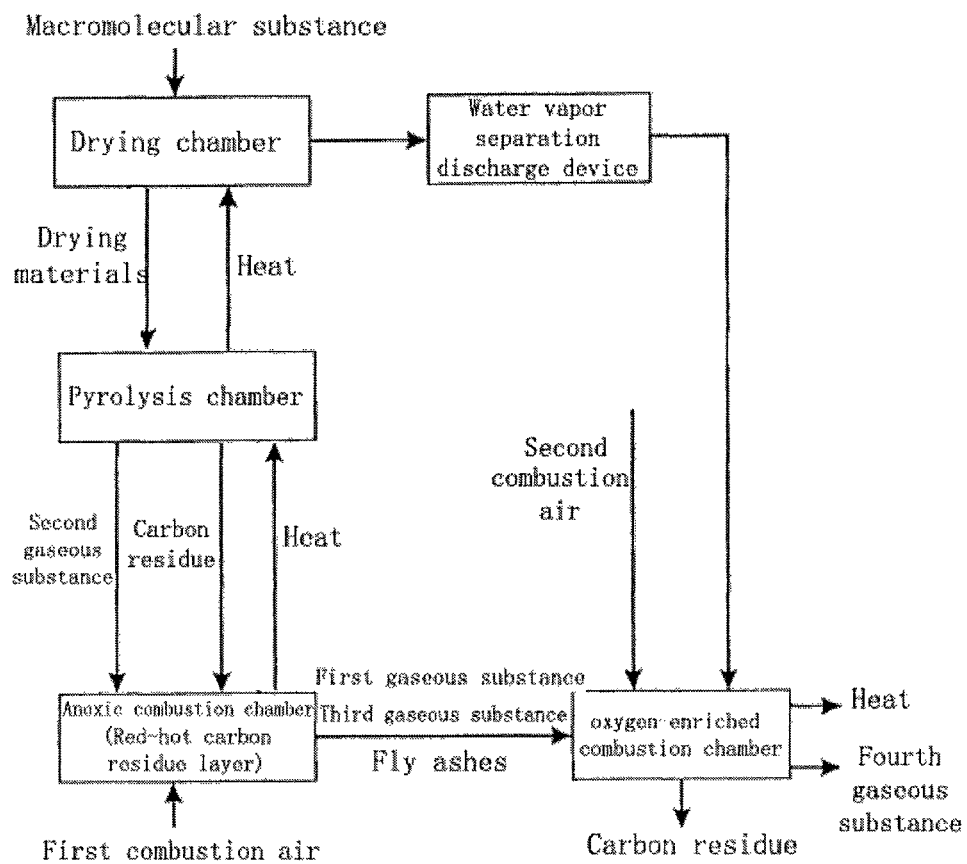

the FIG. 6, the FIG. 7, the FIG. 8, the FIG. 9 and the FIG. 10 are the internal structure diagrams of the fourth, the fifth, the sixth, the seventh and the eighth concrete implementation schemes, and are five concrete implementation schemes in the second class of implementation schemes disclosed by the invention;

the FIG. 11 is the internal structure diagram of the ninth concrete implementation scheme, and is a concrete implementation scheme of the third class of implementation schemes disclosed by the invention;

the FIG. 12 and the FIG. 13 are the internal structure diagrams of the tenth and the eleventh concrete implementation schemes, and are two concrete implementation schemes in the fourth class of implementation schemes disclosed by the invention;

the FIG. 14 is a relationship diagram between the temperature and an excessive air coefficient of a pyrolysis or combustion product of the macromolecular substance in the first class of implementation schemes shown in the FIG. 1 to the FIG. 3 and an effective coefficient of a gasification product while the FIG. 15 is the relationship diagram between the temperature and the excessive air coefficient of the pyrolysis or combustion product of the macromolecular substance in the second, third and fourth classes of implementation schemes shown in the FIG. 6, the FIG. 7, the FIG. 8, the FIG. 9, the FIG. 10, the FIG. 11, the FIG. 12 and the FIG. 13 and the effective coefficient of the gasification product; a lower horizontal coordinate in the figure represents the excessive air coefficient, is the ratio of the actual supply air quantity to the theoretical air quantity of a certain amount of macromolecular substances in the gasification combustion process, and is represented by alpha; an upper horizontal coordinate represents the effective coefficient of the gasification production, is the equivalent ratio of the quantity of the organic micromolecular free radicals contained in the micromolecular combustible gas which is actually gasified from the certain amount of macromolecular substances to the theoretical air quantity, and is represented by beta;

a vertical coordinate represents the temperature of the pyrolysis or combustion product of the macromolecular substance and is represented by centigrade degree; $Q_1$, $Q_2$, $Q_3$, $Q_4$ and $Q_5$ respectively represent the quantity of combustion air, which is obtained from the macromolecular substance at the AB or AB' section, BC or B'C' section, CD or C'D section, DD' or DE or $DE_1$ or DE' section and DD" section; "by the first $1^\#$, the second $2^\#$ and the third $3^{\#}$" respectively represent the temperature characteristics of the first heat energy collector, the second heat energy collector and the third heat energy collector after being cooled; the "by the water vapor" represents the temperature characteristics after cooling by direct heat recovery of the mixed water vapor; the "by sudden-cooling" represents the temperature characteristics after the secondary combustion product is led to the cooling water and cooled in a sudden-cooling direct washing manner;

the FIG. 16 and the FIG. 17 are respectively craft box diagrams of two different concrete implementation modes, but the heat-preservation transportation and indirect heat energy recovery procedures are not labeled in the figures.

THE NAME AND THE SERIAL NUMBER OF CONSTITUENT PARTS IN THE FIGURES ARE AS FOLLOWS (wherein the same name and serial number are used by the same kind of constituent parts)

An anoxic combustion chamber 1, a fan 2, a pyrolysis chamber 3, an annular airway 4, thermal-insulating layers 5, a drying chamber 6, an exhaust port 7, an exhaust valve 8, an inner furnace body 9, a storage bucket 10, a furnace lid 11, a tertiary oxygen supply valve 12, a steam valve 13, an oxygenating tube 14, a water vapor separation discharge device 15, an air duct 16, an air outlet 17, a first heat energy collector 18, a furnace head 19, an oxygen-enriched combustion chamber 20, a partition plate 21, a baffle plate 22, a gas valve 23, a primary combustion product outlet 24, a secondary oxygen supply valve 25, a secondary oxygen supply device 26, an insulated cover 27, a dust removal chamber 28, a guide duct 29, an annular air flue 30, an oxygen supply ash outlet 31, a grid melter 33, an ash chamber 33, a primary oxygen supply device 34, a seal cover 35, an air inlet 36, a fire seal plug 37, an annular flume 38, a seal ring 39, a one-way air flue 40, a one-way airway 41, a multifunctional centralized control valve 42, a connecting flange 43, a secondary combustion product outlet 44, a heat-resistant seal ring 45, an ash separator 46, a blow-down valve 47, a water inlet valve 48, a water outlet valve 49, an insulated bucket 50, an overflow pipe 51, a secondary combustion product conduit 52, a water jacket 53, a view crater 54, a second heat energy collector 55, a heat-resistant alloy wire mesh 56, a porous ceramic plate 57, a water supplement valve 58, a pneumatic valve 60, a stock bucket 60, a compressed air induction device 61, a feeding hopper 62, a shower nozzle 63, a scrubber tower 64, a filler 65, a lye supplement valve 66, an anti-corrosion hot water pump 67, a mixed water vapor outlet 68, a washing dust chamber 69, a lye tank 70, a third heat energy collector 71, a feeder 72, an oblique base plate 73, a pneumatic switch 74, a water dust scrubber 75, an induced draft fan 76, a chain grate stoker 77, a broken material collecting chamber 78, a feeding switch 79, a chain wheel 80, a hearth 81, a charcoal fire igniter 82, a storage chamber 83 and a seal gasket 84.

Concrete Implementation Modes:

The principle and the characteristics of the invention are specifically described by combining the figures as follows. The listed examples just are used for explaining the invention, but not used for limiting the effective protection scope of the invention.

Embodiment 1

A high-efficiency clean burning device of a macromolecular substance, shown in the FIG. 1, comprising an oxygen-enriched combustion chamber 20, an anoxic combustion chamber 1, a pyrolysis chamber 3 and a drying chamber 6, is characterized in that an ash chamber 33 and a primary oxygen supply device 34 are arranged on a central axis below the anoxic combustion chamber 1, wherein a primary combustion product outlet 24 and an annular airway 4 are sequentially arranged at the periphery of the upper part of the anoxic combustion chamber 1; an air outlet 17 and a dust removal chamber 28 are sequentially arranged at one side of the annular airway 4; an infrared combustion furnace head 19 is arranged at the upper part of the dust removal chamber 28; the oxygen-enriched combustion chamber 20 is arranged inside the furnace head 19; the first heat energy collector 18 is arranged on the oxygen-enriched combustion chamber 20; the first heat energy collector 18 is a common frying pan arranged thereon when the oxygen-enriched combustion chamber 20 of the furnace head 19 normally works; meanwhile, a secondary oxygen supply device 26 is arranged inside the dust removal chamber 28; the pyrolysis chamber 3 and the drying chamber 6 are sequentially arranged above the anoxic combustion chamber 1; the pyrolysis chamber 3, the drying chamber 6 and the anoxic combustion chamber 1 are of a straight structure; thermal-insulating layers 5 are arranged at the peripheries of the outer sides of the dust removal chamber 28, the anoxic combustion chamber 1, the pyrolysis chamber 3 and a drying chamber 6; meanwhile, a furnace lid 11 is arranged at the upper part of the drying chamber 6; a water vapor separation discharge device 15 led to the oxygen-enriched combustion chamber 20 of the furnace head 19 is arranged on the furnace lid 11; the oxygen-enriched combustion chamber 20 is a combustion space arranged on the porous ceramic plate of the furnace head 19 and below the alloy wire mesh; the anoxic combustion chamber 1 is a combustion space on a porous ceramic plate of the furnace head 19 and below the alloy wire mesh; the anoxic combustion chamber 1 is a lower space of a cylindrical inner furnace body 9; the pyrolysis chamber 3 and the drying chamber 6 are respectively a lower half space and an upper half space of a round storage bucket 10, which are coaxially arranged at the middle and upper part of the inner furnace body 9; a movable combined structure is formed between the storage bucket 10 at the middle and upper part of the inner furnace body 9; a movable combined structure is formed between the storage bucket 10 and the inner furnace 9; the storage bucket 10 can be conveniently taken out from the inner furnace body 9 when ashes are accumulated inside the annular airway 4 or an air outlet 17 to affect normal ventilation; the primary oxygen supply device 34 comprises an oxygen supply ash outlet 31, a slot ash chamber 33, a grid melter 32, an air inlet 36 and a fan 2 in combination; the oxygen supply ash outlet 31 is arranged on the central axis of the bottom of the inner furnace body 9; the slot ash chamber 33 is enclosed by steel plates; the grid melter 32 is connected with a seal cover 35 into a whole; the air inlet 36 is communicated with the annular air flue 30; the fan 2 is arranged on the annular air flue 30; the annular airway 4 comprises the inner furnace body 9 and the storage bucket 10 which is coaxially arranged at the middle and upper part; an exhaust port 7 and an exhaust valve 8 are formed at one side of the upper part of the annular airway 4; the air outlet 17 is formed on the wall of the inner furnace body 9 adjacent to the dust removal chamber 28; a gas valve 23 is arranged on the air outlet 17; the gas valve 23 is a line contact manual gyro valve; the gas valve 23 has the advantages of being flexible to start and heat-resistant, and stepless regulation on the air supply can be achieved; the dust removal chamber 28 is a cuboid hollow steel plate member arranged at one side of the inner furnace body 9, and is partitioned into left and right parts of which the lower parts are communicated by a suspended partition plate 21; four oblique baffle plates 22 are arranged inside a space at the right side, so as to possibly reduce the fly ash content in the gas by changing the airflow direction by virtue of gravity sedimentation of the flying ashes and prevent secondary pollution. The fly ashes in the embodiment mainly are carbon particles, which can be recycled; meanwhile, the ash outlet and the insulated cover 27 are formed at one side of the bottom of the dust removal chamber 28; the secondary oxygen supply device 26 is composed of the guide duct 29, the secondary oxygen supply valve 25, the annular air flue 30 and the fan 2; the guide duct 29 is a 7-shaped metal conduit with openings at two ends; one end of the guide duct is butted to the annular air flue 30, and the other end passes through the partition plate 21 and is arranged inside the space at the right side of the dust removal chamber 28; the secondary oxygen supply valve 25 is a line contact manual gyro valve; the water vapor separation discharge device 15 is composed of the air duct 16, the steam valve 13, the oxygenating tube 14 and the tertiary oxygen supply valve 12 thereof in combination.

A high-efficiency clean burning method of the macromolecular substance adopted by the embodiment, shown in the FIG. 1, the FIG. 14 and the FIG. 16, comprises the following processing steps:

(1), adding a certain amount of biomass carbon residue to a first combustion air to carry out anoxic combustion below the theoretical oxygen demand, so as to generate a first gaseous substance, fly ashes and a red-hot carbon residue layer, wherein the first gaseous substance mainly comprises carbon monoxide CO, hydrogen $H_2$ and nitrogen $N_2$; the first gaseous substance and the fly ashes are in an electronic excited state;

(2), leading the heat generated by anoxic combustion to the macromolecular substance, preheating and drying the macromolecular substance, separating a part of water to increase the reaction temperature and promote pyrolysis gasification, so as to generate a second gaseous substance and a carbon residue, wherein the second gaseous substance comprises "dioxin" and/or other "tar" macromolecular substances and a part of micromolecular combustible gas and a small amount of water vapor;

(3), taking the red-hot carbon residue as a pyrolysis catalyst, leading the second gaseous substance to the red-hot carbon residue layer to carry out oxygen catalytic cracking, so as to generate a third gaseous substance and fly ashes, wherein the third gaseous substance does not contain "dioxin" and/or other "tar" macromolecular substances, but contains a certain amount of micromolecular hydrocarbon, carbon monoxide, hydrogen, nitrogen and a part of organic micromolecular free radicals; the third gaseous substance and the fly ashes are in the electronic excited state;

(4), merging and mixing the third gaseous substance and the fly ashes in the electronic excited state with the first gaseous substance and the fly ashes, and leading to an oxygen-enriched combustion zone in a heat preservation manner under a heat preservation condition after heat preservation dust removal; adding a second combustion air above the theoretical oxygen demand to carry out oxygen-enriched combustion and simultaneously carry out heat recovery, so as to control the temperature of the combustion product above the melting points of the fly ashes and below the generation temperature of a thermal nitric oxide $NO_x$, thereby converting into a slag and a fourth gaseous substance as far as possibly under the premise of reducing the $NO_x$;

(5), directly discharging the fourth gaseous substance after heat recovery into the atmosphere;

wherein 'preheating and drying the macromolecular substance and separating a part of water' in the step (2) are as follows: most of water contained in the macromolecular substance is gasified in a decalescence manner; the vaporized water mixed with the micromolecular combustible gas is separated from the material in the form of water vapor, fully premixed with the third combustion air above the theoretical oxygen demand, and then led into the oxygen-enriched combustion zone in the step (4), so as to achieve gas conversion and decalescence cooling of the water vapor and instant complete combustion of the micromolecular combustible gas;

the situation that "the third gaseous substance does not contain 'dioxin' and other 'tar' macromolecular substances" in the step (3) is achieved by controlling the amount of the first combustion air, the effective thickness of the red-hot carbon residue layer and the moisture content of the second gaseous substance; the effective thickness of the red-hot carbon residue layer is the carbon residue thickness of which the second gaseous substance actually flows in the red-hot carbon residue layer; the control of "the amount of the first combustion air" and "the moisture content of the second gaseous substance" is to ensure that the temperature of the red-hot carbon residue layer is greater than or equal to 850 DEG C.; the control of the "the moisture content of the second gaseous substance" is also achieved by controlling the water vapor separation discharge device 15 arranged on the furnace lid 11, namely controlling the steam valve 13 and the tertiary oxygen supply valve 12;

the situation that "the first gaseous substance and the third gaseous substance are completely burnt" in the step (4) is achieved by controlling the supply of the second combustion air, and the mixing degree of the first gaseous substance, the third gaseous substance and the second combustion air, wherein the "control of the supply of the second combustion air" is achieved by controlling the secondary oxygen supply valve 25; judgment whether the control of the tertiary oxygen supply valve 12 and the secondary oxygen supply valve 25 is proper is based on whether the oxygen-enriched combustion of the oxygen-enriched combustion chamber 20 of the furnace head 19 achieves flameless combustion and non-black smoke generation; meanwhile, the situation that "a lot of $NO_x$ and fly ashes are not generated" in the step (4) is achieved by controlling the temperature of a combustion product of the oxygen-enriched combustion chamber 20 of the furnace head 19 while "the temperature of the combustion product of the oxygen-enriched combustion chamber 20 of the furnace head 19" is achieved by simultaneously carrying out direct heat recovery by filling the mixed water vapor which is completely premixed with the third combustion air into the oxygen-enriched combustion chamber 20 of the furnace head 19 and carrying out indirect heat recovery by the first heat energy collector 18 of the common frying pan arranged on the oxygen-enriched combustion chamber 20 of the furnace head 19.

Further Description as to the High-Efficiency Clean Burning Process of the Macromolecular Substance in the Embodiment by Comparing with the FIG. 1 and the FIG. 14 is as Follows.

As shown in the FIG. 14, the curve shows that the actual supply combustion air is 0, and the macromolecular substance is in a preheating and drying or dry distillation pyrolysis state when the excessive air coefficient alpha is 0; as shown in the AB or BC section in the FIG. 1 and the FIG. 14, the curve shows that the actual supply combustion air is smaller than the theoretical air quantity, the biomass carbon residue is in an anoxic combustion state, and the temperature of the combustion product increases along with increase of alpha, but the increase amplitude in the embodiment is not large when alpha is smaller than 1 and greater than 0; as shown in the CD section in the FIG. 1 and the FIG. 14, the curve shows that endothermic reaction such as pyrolysis, reduction and the like also exists in the CD section besides that the exothermic reaction of anoxic combustion exists in the CD section; the curve shows that the actual supply air is equal to the theoretical air quantity, and the temperature of the combustion product can achieve the highest theoretical combustion temperature when alpha is equal to 1; as shown in the E" point in the FIG. 14, it's actually not the case; from the FIG. 14 in fact, the beta value of the combustion product of the final gasification production under the condition that alpha is equal to 1 and beta is equal to 1 is 0.4 instead of 0, which indicates that the micromolecular combustible gas in the final gasification product comprises the organic micromolecular free radicals, and does not achieve complete combustion. Therefore, the highest theoretical combustion temperature E" point does not exist in fact. The actual combustion work condition is not an ideal adiabatic state, so that the highest temperature E' of the actual combustion product is bound to be lower than the highest theoretical combustion temperature E", and excessive combustion air which exceeds the theoretical air quantity must be supplied, so that the temperature of the actual combustion product achieves the possible highest temperature point E', namely alpha is greater than 1. From the FIG. 14, the temperature of the actual combustion product just can achieve the highest combustion temperature E' when alpha is equal to 1.15 while the temperature of the combustion product will be reduced by the excessive combustion air when alpha is greater than 1.15; at this point, the temperature of the combustion product descends along with increase of the alpha value.

There are three curves in the FIG. 14 in all. The curves represent the relationship diagrams between the temperature of the pyrolysis or combustion product of the macromolecular substance and alpha and beta in different states, wherein the first curve A-B-C-D-D"-E" represents that the theoretical temperature curve of the pyrolysis or combustion product of the macromolecular substance in an adiabatic state, the combustion mode of the final gasification product is air premixing flameless combustion in the adiabatic state, and alpha is equal to 1.0; the second curve A-B-C-D-D'-E' represents that the temperature curve of the pyrolysis or combustion product of the macromolecular substance in a common non-adiabatic state, the combustion mode of the final gasification product is air premixing flameless combustion in the common non-adiabatic state, and alpha is equal to 1.15; the third curve A-B-C-D-D'-E represents that the temperature curve of the pyrolysis or combustion product after being cooled by direct heat recovery of the mixed water vapor and indirect heat recovery of the first heat energy collector from the macromolecular substance in the common non-adiabatic state, the combustion mode of the final gasification product is air premixing flameless combustion in the common non-adiabatic state, and alpha is equal to 1.15; Q1, Q2, Q3, Q4 and Q5 in the FIG. 14 respectively represent the combustion air quantities of the macromolecular substance obtained at the AB section, the BC section, the CD section, the DD' section and the DD" section; "water vapor or 1#" represent the temperature characteristics after cooling by direct heat recovery of water vapor and indirect heat recovery of the first heat energy collector while a shadow region shown in the FIG. 14 represents a generation region of the thermal $NO_x$, and the region is generated in a high-temperature aerobic environment over 1500 DEG C.

Please refer to the FIG. 1 and the FIG. 14 together as follows: the A, B, C, D, D', D" and E points shown in the FIG. 1 and the A, B, C, D, D', D" and E points shown in the FIG. 14 are in one-to-one correspondence. From the FIG. 1 and the FIG. 14, the combustion air quantity $Q_3$ of the biomass carbon residue from the macromolecular substance obtained at the CD section is smaller than the theoretical air quantity, and alpha is smaller than 1. Thus, the biomass carbon residue at the CD section is in the anoxic combustion state; the temperature of the combustion product is kept at 850-900 DEG C. in general and increases along with increase of alpha, but the increase amplitude is not large, and it is shown that the endothermic reactions such as pyrolysis, reduction and the like also exist in the CD section besides that the exothermic reaction of anoxic combustion exists. As shown in the FIG. 1, the reaction process is as follows: the combustion air $Q_3$ from the fan 2 finally passes through the grid melter 32 and enters the anoxic combustion chamber 1 via the oxygen supply ash outlet 31 after passing through the annular air flue 30, the air inlet 36 and the ash chamber 33. Alpha is smaller than 1, so that the biomass carbon reside inside the anoxic combustion chamber 1 can instantly produce enough micromolecular combustible gases because of anoxic combustion, and can release heat, so as to achieve quick ignition of the furnace head 19, wherein the micromolecular combustible gases mainly comprise CO and $H_2$; no smoke is generated in start. The ignition time does not exceed 1 minute in general under normal circumstances. These micromolecular combustible gases together with associated incombustible mixed gases because of reaction are collectively called the first gaseous substances by us, and mainly comprise CO, $H_2$ and $N_2$. An incombustible inorganic matter is converted into fly ashes near the oxygen supply ash outlet 31, namely near a first combustion air injection opening, forms slag under a high-temperature condition of 1000-1200 DEG C., and finally automatically falls into the ash chamber 33 through the oxygen supply ash outlet 31;

meanwhile, under the action that the heat generated by the anoxic combustion chamber 1 comprises radiant heat and conductive heat, the semicoke dry hot material at the BC section is closer to the anoxic combustion chamber 1 in the CD section, resulting in strong thermal radiation and small moisture content, so that the BC section quickly warms up, and the pyrolysis gasification temperature can be quickly achieved, so as to produce a lot of pyrolysis gas containing the tar macromolecular gaseous substance; the pyrolysis gas comprises a part of micromolecular combustible gas and a little of water vapor, and is called the second gaseous substance by us; the micromolecular combustible gas is mainly from a pectin extract which is combined into a macromolecular polymer by the action of the Van der Waals' force between hydrogen bonds and molecules, and is generated in a temperature interval of about 150-200 DEG C. at the B point of the BC section. In addition, another part of organic micromolecular free radicals from the pyrolysis gas in a high-temperature cracking manner are generated in a temperature interval of about 750-850 DEG C. near the C point of the BC section. From the FIG. 14, the combustion air quantity $Q_2$ obtained at the BC section is 0, namely alpha is equal to 0; the macromolecular substance is mainly subjected to dry distillation and pyrolysis reaction at the BC section. Although the pyrolysis gas generated at the BC section is large, most of macromolecular substance exists in the pyrolysis gas in a form of a tar macromolecular monomeric compound of forming lignin, cellulose and hemicellulase, wherein the micromolecular combustible gas and the organic micromolecular free radicals are small in content. Therefore, beta is just 0.2, and the temperature of the pyrolysis product is kept within a range of 150-850 DEG C. in general.

Meanwhile, the newly added material at the AB section generates a lot of water vapor due to decalescence gasification of the contained water. The FIG. 14 shows that the amount $Q_1$ of the combustion air obtained from the AB section and the produced micromolecular combustible gas are 0, namely alpha=0, beta=0. The macromolecular substance at the AB section is mainly preheated and dried, and belongs to the physical change phase, and the temperature of a gasification product of the macromolecular substance is kept within the temperature range of 50-150 DEG C. in general.

As shown in the FIG. 1, upper and lower layers of dynamic distribution of the mixed gas are roughly formed inside the storage bucket 10 from top to bottom due to the effects of a gasification product generation part and the relative density thereof, wherein the upper layer of AB section is a coexistence zone of the water vapor, a part of micromolecular combustible gas and the newly added material; the lower layer of BC section is the coexistence zone of the tar macromolecular gaseous substance, the organic micromolecular free radicals and a semicoke dry hot material. The gaseous products continuously increase and the air pressure inside the bucket gradually increases along with continuous pyrolysis gasification reaction of the macromolecular substance in the bucket due to the fact that all gaseous products are accumulated inside the storage bucket 10; the tar macromolecular gaseous substance and a part of organic micromolecular free radicals at the lower layer of BC section of the storage bucket 10 comprise a little of entrained water vapor when a certain pressure is achieved, so as to be compelled to slowly drift downwards under the action of the air pressure inside the bucket, and finally enter the red-hot carbon residue layer inside the anoxic combustion chamber 1 at the CD section; "oxygen catalytic cracking" of the tar micromolecular combustible substance and catalytic reforming and high-temperature reduction reaction of the organic micromolecular free radicals and a little of water vapor are finished inside the red-hot carbon residue layer. Finally, all tar micromolecular combustible substances are converted into organic micromolecular free radicals, wherein one part of the organic micromolecular free radicals are combined with hydrogen atoms to form micromolecular hydrocarbons in a stable state, another part is finally converted into CO and $H_2$ in the reducing atmosphere with enough carbon source under the action of oxygen atoms by a series of complicated chemical reactions, and the other part still exists in the form of the organic micromolecular free radicals; finally the micromolecular combustible mixed gas, which takes micromolecular combustible gases such as $CH_4$, CO, $H_2$ and the like as primary gases and the organic micromolecular free radicals as auxiliary materials, and contains a certain amount of $CO_2$ and $N_2$ and the like is formed. The micromolecular combustible mixed gas is called as a third gaseous substance. As shown in the FIG. 14, the micromolecular combustible gas, which is finally obtained from the macromolecular substance in the embodiment at the position of a D point by the gasification reaction process via the A, B, C and D points comprises the organic micromolecular free radicals, thereby finally achieving a due theoretical gasification value. Therefore, beta=1.

As shown in the FIG. 1, the semicoke dry hot material inside the pyrolysis chamber 3 is gradually carbonized, and falls into the anoxic combustion chamber 1 at the lower part along with continuous execution of pyrolysis gasification of the macromolecular substance in the storage bucket 10 and "oxygen catalytic cracking" of the tar macromolecular gaseous substance in the anoxic combustion chamber 1, so as to supply reaction consumption of the red-hot carbon residue inside the anoxic combustion chamber 1, resulting in overall downward movement of all solid substances and gaseous substances inside the storage bucket 10; meanwhile, the quantity and the volume of the water vapor accumulated at the upper layer of the storage bucket 10 also continuously increase and form a trend of downward expansion, at this point, a lot of water vapor at the upper layer of the storage bucket 10 will certainly flow over into the pyrolysis chamber 3 at the lower part if no measures are adopted, so as to enter the red-hot carbon residue layer of the anoxic combustion chamber 1 finally, resulting in complete collapse of normal pyrolysis reaction inside the pyrolysis chamber 3 and normal "oxygen catalytic cracking" reaction inside the red-hot carbon residue layer, thereby generating the tar wastewater, so that the bad conditions that the furnace head 19 generates a lot of smoke, or even cannot normally work at all and just smokes without ignition and the like are generated. In order to effectively avoid the bad conditions, the water vapor separation discharge device 15 is specifically arranged on the furnace lid 11 at the upper part of the storage bucket 10 in the embodiment; at this point, the gas conversion and decalescence cooling of the water vapor and instant complete combustion of the micromolecular combustible gas are achieved just by properly starting the steam valve 13 and the tertiary oxygen supply valve 12 on the furnace lid 11, fully premixing the water vapor accumulated at the upper part of the storage bucket 10 with the third combustion air together with the entrained micromolecular combustible gas, and then leading into the oxygen-enriched combustion chamber 20 of the furnace head 19, thereby effectively avoiding various bad conditions, so that the device can ensure safe and stable operation even if a wet material is used. In addition, the embodiment has the beneficial effects as follows: the mixed water vapor is led into the oxygen-enriched combustion chamber 20 of the furnace head 19, so that the temperature of the oxygen-enriched combustion product can be effectively reduced due to the high-temperature reduction decalescence reaction of the water vapor besides that gas conversion of the water vapor can be achieved and the air quantity is improved, so that the temperature of the combustion product is controlled above the melting points of the fly ashes and below the generation temperature of the thermal $NO_x$. Thus, the gasification product does not generate a lot of $NO_x$ and fly ashes in the oxygen-enriched combustion process.

It is worth noting that the steam valve 13 should be in a "proper open" state in the process of separating the water vapor inside a discharge furnace, so that a certain air pressure is always kept inside the furnace under the premise that the water vapor inside the furnace does not flow back to the pyrolysis chamber 3 and the anoxic combustion chamber 1 along with a pyrolysis gas, so as to prompt sustainable and stable implementation of the "oxygen catalytic cracking" of the tar macromolecular gaseous substance inside the red-hot carbon residue layer. On one hand, the damage to gas conversion of the mixed water vapor inside the oxygen-enriched combustion chamber 20 of the furnace head 19 is prevented due to overlarge opening of the steam valve 13, and on the other hand, the situation that the tar macromolecular gaseous substance directly enters the oxygen-enriched combustion chamber 20 of the furnace head 19 through the water vapor separation discharge device 15 in absence of pyrolysis, resulting in tar pollution is also prevented.

As shown in the FIG. 1, the micromolecular combustible gas from the anoxic combustion chamber 1 comprises a first gaseous substance, a third gaseous substance and fly ashes, and is led into the dust removal chamber 28 in a heat preservation manner via the primary combustion product outlet 24, the annular airway 4 and the air outlet 17, fully premixed with the second combustion air supplied by the secondary oxygen supply device 26 after most of fly ashes are removed by the dust removal chamber 28, and finally led into the oxygen-enriched combustion chamber 20 of the furnace head 19 at the upper part of the dust removal camber 28 in the heat preservation manner, so as to carry out oxygen-enriched combustion in the embodiment.

The FIG. 14 shows that the quantity $Q_4$ of the combustion air obtained from the micromolecular combustible gas at the DD' section is greater than the theoretical air quantity; alpha=1.15, but the temperature of the combustion product of the combustion air is constantly kept at 900 DEG C. all the time, and the beta value of the micromolecular combustible gas is kept at the constant value "1" all the time; the beta value represents that the combustion air obtained at the DD' section and the micromolecular combustible gas are not consumed; the DD' section substantially becomes a premixing zone of the micromolecular combustible gas and the combustion air and a heat-insulating transportation zone thereof. The combustion air obtained from the micromolecular combustible mixed gas at the DD' section and the contained micromolecular combustible gas are not consumed, so that the value at the moment of entering the D'E section is the same as the alpha and beta values thereof at the DD' section, alpha=1.15 and beta=1. However, we simultaneously find out that the beta value is instantly reduced to 0 after the micromolecular combustible gas enters the D'E section from the FIG. 14, which indicates that the contained micromolecular combustible gas instantly achieves complete combustion at the D'E section, namely inside the oxygen-enriched combustion chamber 20 of the furnace head 19 shown in the FIG. 1, and the combustion mode is air premixing-type infrared flameless combustion. Meanwhile, the phenomenon also indicates that chemical energy of the micromolecular combustible gas comprising the organic micromolecular free radicals is instantly converted into heat energy at the D'E section, namely inside the oxygen-enriched combustion chamber 20 of the furnace head 19 shown in the FIG. 1, so as to achieve heat sublimation of the micromolecular combustible gas. Thus, compared with the prior art, the final gasification product achieves complete combustion; the carbon monoxide, the smoke and the secondary pollution of the tar are avoided by the embodiment; meanwhile, the device in the embodiment also has higher thermal efficiency.

Meanwhile, the mixed water vapor which is from the drying chamber 6 and completely premixed with the third combustion air is led into the oxygen-enriched combustion chamber 20 of the furnace head 19 in the embodiment, meanwhile, the first heat energy collector 18 is arranged on the oxygen-enriched combustion chamber 20 of the furnace head 19, so that the temperature of the final combustion product inside the oxygen-enriched combustion chamber 20 of the furnace head 19 is instantly reduced to an E point of 1000 DEG C. from an E' point of 1700 DEG C. Thus, the temperature of the final combustion product is successfully controlled above the melting points of the fly ashes at about 800 DEG C. and below the generation temperature of the thermal $NO_x$ at 1500 DEG C.; the secondary pollution of the fly ashes and the $NO_x$ is reduced to the lowest limit at the part of the furnace head 19. Therefore, energy-efficient and environment-friendly dual effects are achieved.

Moreover, the device runs at low pressure or normal pressure all the time, and the micromolecular combustible gas is ready-to-use after production, so that the operation of the device is very safe.

In addition, the embodiment has the beneficial effects: the furnace head 19 arranged in the embodiment is an infrared balanced combustion furnace head, and the temperature of the furnace head is high, balanced and stable, so that the complete combustion of secondary pyrolysis can be achieved even if a little of tar macromolecular gaseous substance is entrained into the micromolecular combustible gas which is led into the oxygen-enriched combustion chamber 20 of the furnace head 19 in the heat preservation manner when an exception occurs because of a fault of the embodiment. Thus, secondary pollution of the tar can be effectively avoided.

Embodiment 2

Figure 2:
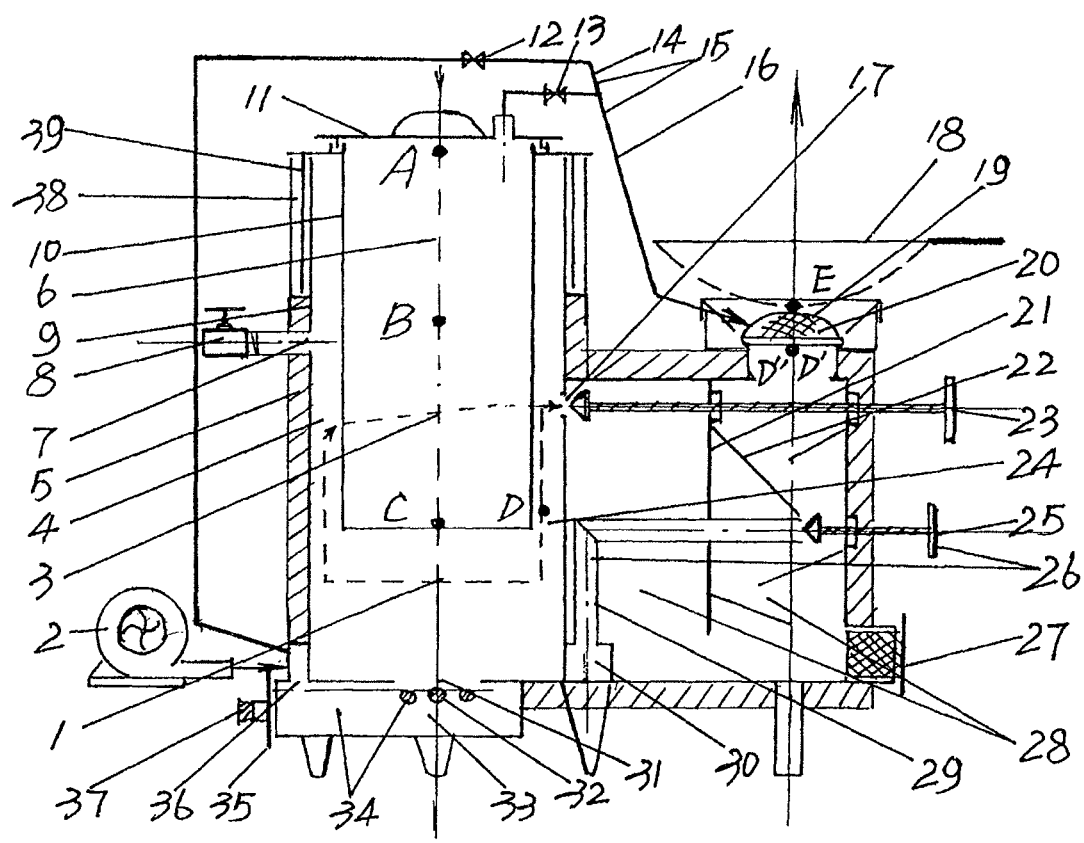

A high-efficiency clean burning device of a macromolecular substance, shown in the FIG. 2, comprising an oxygen-enriched combustion chamber 20, an anoxic combustion chamber 1, a pyrolysis chamber 3 and a drying chamber 6, compared with the [embodiment 1], comprises the differences as follows: movable connection between a storage bucket 10 and an inner furnace body 9 is achieved by an annular water flume 38 arranged at the outer side of the upper part of the inner furnace body 9, and a seal ring 39 which is butted to the upper part of the storage bucket 10 and extends inside the bottom of the annular water flume 38. In practical operation process, when the material inside the storage bucket 10 affects normal gas production due to poor blanking, the storage bucket 10 can be pushed to rotate inside the inner furnace body 9 through a handle arranged on a furnace lid 11, so as to drive the material to integrally descend, thereby restoring normal gas production. In addition, the other parts are the same as those in the [embodiment 1].

A high-efficiency clean burning method of a macromolecular substance adopted by the embodiment is the same as the [embodiment 1] in processing steps.

Embodiment 3

A high-efficiency clean burning device of a macromolecular substance, shown in the FIG. 3, comprising an oxygen-enriched combustion chamber 20, an anoxic combustion chamber 1, a pyrolysis chamber 3 and a drying chamber 6, compared with the embodiment 1, comprises the differences as follows: an inner furnace body 9 and a storage bucket 10 are merged into a whole; a one-way airway 41 is arranged at one side; an air outlet 17 is formed on the one-way airway 41; meanwhile, a one-way air flue 40 is arranged below the one-way airway 41. In addition, a dust removal chamber 28 is arranged at one side of the one-way airway 41; six baffle blocks 22 are arranged inside a space at the right side of the dust removal chamber 28; the other four baffle blocks 22 are combined into a funnel shape and arranged on an air outlet of a secondary oxygen supply device 26 besides that the setting of two baffle blocks at the lower part is the same as that in the [embodiment 1]; in addition, the other parts are the same as those in the [embodiment 1].

A high-efficiency clean burning method of a macromolecular substance adopted by the embodiment is the same as the [embodiment 1] in processing steps.

Embodiment 4

A high-efficiency clean burning device of a macromolecular substance, shown in the FIG. 6, comprising an oxygen-enriched combustion chamber 20, an anoxic combustion chamber 1, a pyrolysis chamber 3 and a drying chamber 6, is characterized in that a primary oxygen supply device 34 is arranged on the anoxic combustion chamber 1, wherein a grid melter 32, a primary combustion product outlet 24, the oxygen-enriched combustion chamber 20 and an ash chamber 33 are sequentially arranged below the anoxic combustion chamber 1; a secondary oxygen supply device 26 is arranged on a gas circuit from the primary combustion product outlet 24 to the oxygen-enriched combustion chamber 20; the pyrolysis chamber 3 and the drying chamber 6 are sequentially arranged above the anoxic combustion chamber 1; the ash chamber 33, the oxygen-enriched combustion chamber 20, the anoxic combustion chamber 1, the pyrolysis chamber 3 and the drying chamber 6 are communicated and of a straight structure; a secondary combustion product outlet 44 is formed on the oxygen-enriched combustion chamber 20; meanwhile, a connecting flange 43 and a heat-resistant seal ring 45 are sequentially arranged on the secondary combustion product outlet 44; first heat energy collectors 18 are arranged at the peripheries of the outer sides of the ash chamber 33, the oxygen-enriched combustion chamber 20, the anoxic combustion chamber 1, the pyrolysis chamber 3 and the drying chamber 6, and are water jackets 53; a thermal-insulating layer 5 is arranged at the periphery of the outer side of each water jacket 53; meanwhile, a furnace lid 11 is arranged on the drying chamber 6; a water vapor separation discharge device 15 led to the oxygen-enriched combustion chamber 20 is arranged on the furnace lid 11, and composed of an air duct 16, a steam valve 13, an oxygenating tube 14, a tertiary oxygen supply valve 12, a multifunctional centralized control valve 42 and a fan 2.

The high-efficiency clean burning method of the macromolecular substance adopted by the embodiment, shown in the FIG. 6, the FIG. 15 and the FIG. 17, and compared with the [embodiment 3] in processing steps, comprises the differences as follows: the first gaseous substance, the fly ashes, the third gaseous substance and the fly ashes in the step (4) are immediately led into the oxygen-enriched combustion zone in a form of the micromolecular combustible mixed gas in a heat preservation manner once being generated, and timely mixed and burnt together with the second combustion air, and the technological links of heat-preservation dust removal and heat-preservation transportation of the micromolecular combustible mixed gas are removed in the embodiment, so that the probability that the organic micromolecular free radicals in the micromolecular combustible mixed gas are combined into the tar macromoelucar substance for the second time in the heat-preservation dust removal and heat-preservation transportation processes is completely avoided; meanwhile, the combustion mode of the micromolecular combustible mixed gas in the oxygen-enriched combustion zone is shown as instant mixed flame combustion of the air, and shown by the D-E section of an A-B-C-D-E temperature curve in the FIG. 15; the temperature of the combustion product increases along with increase of alpha, but the beta value descends along with increase of alpha; it is shown that the micromolecular combustible mixed gas entering the oxygen-enriched combustion zone when alpha is 1.15 achieves complete combustion when alpha is 1.15 and beta is 0; in addition, as shown in the A-B-C-D-E temperature curve in the FIG. 15, direct heat recovery and primary indirect heat recovery of the mixed water vapor are carried out when the final gasification product is subjected to oxygen-enriched combustion by the embodiment; meanwhile, primary indirect heat recovery is also carried out in the drying, pyrolysis and anoxic combustion processes of the macromolecular substance. Compared with the [embodiment 3], the embodiment has the beneficial effects: as shown in the FIG. 6, cracking of the tar macromolecular substance of the second gaseous substance containing the tar macromolecular substance from the pyrolysis chamber 3 is more complete because of larger contact area with the red-hot carbon residue and longer standing time when the second gaseous substance reversely flows through the anoxic combustion chamber 1. Therefore, "dioxin" can be better killed when the embodiment is applied to waste incineration disposal; zero emission of "dioxin" can be achieved under the normal condition; a temperature curve of the pyrolysis or combustion product is shown in the A-B-C-D-E in the FIG. 15. In addition, the other processing steps are the same as those in the [embodiment 3].

Embodiment 5

A high-efficiency clean burning device of a macromolecular substance, shown in the FIG. 7, comprising an oxygen-enriched combustion chamber 20, an anoxic combustion chamber 1, a pyrolysis chamber 3 and a drying chamber 6, compared with the [embodiment 4], comprises the differences as follows: indirect heat energy collectors are not arranged on an ash chamber 33, the oxygen-enriched combustion chamber 20, the anoxic combustion chamber 1, the pyrolysis chamber 3 and the drying chamber 6; in addition, the other parts are the same as those in the [embodiment 4].

A high-efficiency clean burning method of a macromolecular substance adopted by the embodiment, shown in the FIG. 7, the FIG. 15 and the FIG. 17, compared with the [embodiment 4] in the processing steps, comprises the differences as follows: indirect heat recovery is not carried out in the drying, pyrolysis and anoxic combustion of the macromolecular substance and the oxygen-enriched combustion process of the final gasification product besides that direct heat recovery is carried out by filling the mixed water vapor to the oxygen-enriched combustion zone when the final gasification product is subjected to oxygen-enriched combustion in the embodiment; a temperature curve of the pyrolysis or combustion product is shown in A-B'-C'-D-E1 in the FIG. 15; in addition, the other processing steps are the same as those in the [embodiment 4].

Embodiment 6

A high-efficiency clean burning device of a macromolecular substance, shown in the FIG. 8, comprising an oxygen-enriched combustion chamber 20, an anoxic combustion chamber 1, a pyrolysis chamber 3 and a drying chamber 6, compared with the [embodiment 4], comprises the differences as follows: a second heat energy collector 55 is also arranged on a secondary combustion product outlet 44; the second heat energy collector 55 is a water jacket 53; meanwhile, an ash separator 46 is arranged inside the ash chamber 33; a view crater 54 and an insulated cover 27 thereof are formed at one side of the lower part of the secondary combustion product outlet 44; an insulated bucket 50 used as a high-level tank is arranged at the upper part of the water jacket 53; in addition, the other parts are the same as those in the [embodiment 4].

A high-efficiency clean burning method of a macromolecular substance adopted by the embodiment, shown in the FIG. 8, the FIG. 15 and the FIG. 17, compared with the [embodiment 4] in processing steps, comprises the differences as follows: the secondary combustion product which is from the oxygen-enriched combustion zone, and cooled by direct heat recovery and primary indirect heat recovery of the mixed water vapor is a fourth gaseous substance, and is discharged into the atmosphere after being subjected to secondary indirect heat recovery in the embodiment; a temperature curve of the pyrolysis or combustion product is shown in A-B-C-D-E-F in the FIG. 15; in addition, the other processing steps are the same as those in the [embodiment 4].

Embodiment 7

A high-efficiency clean burning device of a macromolecular substance, shown in the FIG. 9, comprising an oxygen-enriched combustion chamber 20, an anoxic combustion chamber 1, a pyrolysis chamber 3 and a drying chamber 6, compared with the [embodiment 4], comprises the differences as follows: an ash separator 46 is arranged inside an ash chamber 33; a porous ceramic plate 57, a heat-resistant alloy wire mesh 56 and a second heat energy collector 55 of a common frying pan are sequentially arranged on a secondary combustion product outlet 44; meanwhile, an insulated bucket 50 used as a high-level tank is arranged at the upper part of the water jacket 53; in addition, the other parts are the same as those in the [embodiment 4].

A high-efficiency clean burning method of a macromolecular substance adopted by the embodiment, shown in the FIG. 9, the FIG. 15 and the FIG. 17, compared with the [embodiment 4] in processing steps, comprises the differences as follows: the secondary combustion product which is from the oxygen-enriched combustion zone, and cooled by direct heat recovery and primary indirect heat recovery of the mixed water vapor is a fourth gaseous substance, and is discharged into the atmosphere after being subjected to secondary indirect heat recovery in the embodiment; a temperature curve of the pyrolysis or combustion product is shown in A-B-C-D-E-F in the FIG. 15; in addition, the other processing steps are the same as those in the [embodiment 4].

Embodiment 8

A high-efficiency clean burning device of a macromolecular substance, shown in the FIG. 10, comprising an oxygen-enriched combustion chamber 20, an anoxic combustion chamber 1, a pyrolysis chamber 3 and a drying chamber 6, compared with the embodiment 7, comprises the differences as follows: a furnace lid 11 is not arranged at an upper port of the drying chamber 6, but a stock bucket 60 and a feeding hopper 62 are sequentially arranged above the drying chamber; pneumatic valves 59 are simultaneously arranged at the top and the bottom of the stock bucket 60; meanwhile, a compressed air induction device 61 is arranged at one side below the pneumatic valve 59 at the top of the stock bucket 60; an annular airway 4 is arranged at the upper port of the drying chamber 6; a water vapor separation discharge device 15 led to the oxygen-enriched combustion chamber 20 is arranged on the annular airway 4; in addition, a porous ceramic plate 57, a heat-resistance alloy wire mesh 56 and a second heat energy collector 55 of a common frying pan shown in the FIG. 9 are not arranged on a secondary combustion product outlet 44 in the embodiment while a washing dust chamber 69 used as an ash chamber 33 is arranged below the oxygen-enriched combustion chamber 20; a baffle plate 22, an overflow pipe 51, a water supplement valve 58, a blow-down valve 47 and a mixed water vapor outlet 68 are arranged on the washing dust chamber; the secondary combustion product outlet 44 of the oxygen-enriched combustion chamber 20 is arranged below the liquid level of the washing dust chamber 69; meanwhile, a lye tank 70 is arranged at one side of the washing dust chamber 69; a mixed water vapor outlet 68, the baffle plate 22, a lye supplement valve 66, an anti-corrosion hot water pump 67 and the blow-down valve 47 are arranged on the lye tank 70; meanwhile, a scrubber tower 64 is arranged on the mixed water vapor outlet 68; a filler 65 is arranged inside the scrubber tower 64; a circulating lye shower nozzle 63 and a third heat energy collector 71 are arranged above the filler 65 inside the scrubber tower 64; in addition, the other parts are the same as those in the [embodiment 7].

A high-efficiency clean burning method of a macromolecular substance adopted by the embodiment, shown in the FIG. 10, the FIG. 15 and the FIG. 17, compared with the [embodiment 7] in processing steps, comprises the differences as follows: the secondary combustion product which is from the oxygen-enriched combustion zone, and cooled by direct heat recovery and primary indirect heat recovery of the mixed water vapor is a fourth gaseous substance, and is completely led to cooling water to carry out sudden-cooled washing dust removal in the embodiment, so that the temperature of the secondary combustion product is instantly cooled to a G point of 100 DEG C. from an F point of 700 DEG C. shown in the FIG. 15; then the secondary combustion product is discharged to the atmosphere after the temperature of the final product is reduced to an H point by alkaline washing acid removal and tertiary indirect heat recovery orderly; a temperature curve of the pyrolysis or combustion product is shown in A-B-C-D-E-F-G-H in the FIG. 15; in addition, the other processing steps are the same as those in the [embodiment 7].

The embodiment has the beneficial effects as follows: on one hand, the fly ashes in the secondary combustion product are removed, so as to remove obstacles for subsequent alkaline washing acid removal procedure; on the other hand, the situation that the temperature of the secondary combustion product which is from the oxygen-enriched combustion chamber 20 and cooled is instantly reduced to 100 DEG C.

from 700 DEG C. is also ensured because of providing of the washing dust chamber 69, so that formation temperature of quick $NO_x$ at 1170-1460 DEG C. and thermal $NO_x$ above 1500 DEG C. is effectively avoided;

meanwhile, the optimal temperature interval of "dioxin" which is secondarily synthetized from a "dioxin" precursor of 250-450 DEG C. is also effectively avoided. Thus, on one hand, the secondary pollution of the $NO_x$ is successfully avoided; on the other hand, the bad conditions of secondary synthesis of the "dioxin" from the "dioxin" precursor, which may be caused by an abnormal operation once in a while, and the like are also successfully avoided. Meanwhile, the secondary pollution of an incombustible acid gas which may exist in the secondary combustion product also can be removed by setting of the "alkaline washing acid removal" procedure. Therefore, not only can zero emission of "dioxin" be achieved, but also the secondary pollution of the fly ashes, nitric oxide and the incombustible acid gas also can be effectively avoided when the embodiment is applied to the waste incineration disposal.

Embodiment 9

A high-efficiency clean burning device of a macromolecular substance, shown in the FIG. 11, comprising an oxygen-enriched combustion chamber 20, an anoxic combustion chamber 1, a pyrolysis chamber 3 and a drying chamber 6, is characterized in that a primary oxygen supply device 34 is arranged on the anoxic combustion chamber 1, wherein a primary combustion product outlet 24 and the oxygen-enriched combustion chamber 20 are sequentially arranged above the anoxic combustion chamber 1; a secondary oxygen supply device 26 is arranged on the primary combustion product outlet 24; the pyrolysis chamber 3, the drying chamber 6 and a feeder 72 are sequentially arranged below the anoxic combustion chamber 1; the oxygen-enriched combustion chamber 20, the anoxic combustion chamber 1, the pyrolysis chamber 3 and the drying chamber 6 are communicated and of a straight structure; thermal-insulating layers are arranged at the peripheries of the outer sides of the anoxic combustion chamber 1, the pyrolysis chamber 3 and the drying chamber 6; a first heat energy collector 18 is arranged on the oxygen-enriched combustion chamber 20; meanwhile, a water vapor separation discharge device 15 led to the oxygen-enriched combustion chamber 20 is arranged on the drying chamber 6, and is of an air duct 16 with a control valve namely a steam valve 13.

A high-efficiency clean burning method of a macromolecular substance adopted by the embodiment, shown in the FIG. 11, the FIG. 15 and the FIG. 17, compared with the [embodiment 5] in processing steps, comprises the differences as follows: the "preheating and drying the macromolecular substance and separating a part of water" in the step (2) are as follows: vaporized water mixed with the micromolecular combustible gas is directly led into the oxygen-enriched combustion zone in the step (4) after being separated from the material in a form of the water vapor, so as to achieve decalescence cooling of the water vapor and instant complete combustion of the micromolecular combustible gas in the embodiment; "simultaneous heat recovery" in the step (4) in the embodiment comprises direct heat recovery of filling the mixed water vapor to the oxygen-enriched combustion zone and indirect heat recovery through a common frying pan arranged on the device; a temperature curve of the pyrolysis or combustion product is shown in A-B-C-D-E in the FIG. 15; in addition, the other processing steps are the same as those in the [embodiment 5].

Embodiment 10

A high-efficiency clean burning device of a macromolecular substance, shown in the FIG. 12, comprising an oxygen-enriched combustion chamber 20, an anoxic combustion chamber 1, a pyrolysis chamber 3 and a drying chamber 6, compared with the [embodiment 9], comprises the difference as follows: the anoxic combustion chamber 1 is a slant combustion chamber; the pyrolysis chamber 3, the drying chamber 6 and a feeder 72 are sequentially arranged at one side opposite to an oblique base plate 73 of the slant combustion chamber; the pyrolysis chamber 3, the drying chamber 6, the feeder 72 and the oblique base plate 73 are horizontally arranged; in addition, the other parts are the same as those in the [embodiment 9].

A high-efficiency clean burning method of a macromolecular substance adopted by the embodiment, shown in the FIG. 12, the FIG. 15 and the FIG. 17, is the same as the [embodiment 9] in processing steps.

Embodiment 10

A high-efficiency clean burning device of a macromolecular substance, shown in the FIG. 13, comprising an oxygen-enriched combustion chamber 20, an anoxic combustion chamber 1, a pyrolysis chamber 3 and a drying chamber 6, compared with the [embodiment 10], comprises the difference as follows: a water vapor separation discharge device 15 arranged on the drying chamber 6 in the embodiment is a feeding hopper 62 with a control valve namely a feeding switch 79 for directly discharging the water vapor into the atmosphere; a feeder 72 is a chain grate stoker 77; a broken material collecting chamber 78 is arranged below the chain grate stoker 77; meanwhile, a pneumatic switch 74 is arranged on the oblique base plate 73 of the slant combustion chamber; the oblique base plate 73 is a rotating shaft-type movable base plate, and can be pushed to rotate and close along the rotating shaft through a pneumatic switch 74, so that the ashes accumulated inside the slant combustion chamber can be transferred into the ash chamber 33 below the oblique base plate 73 at a fixed period; a multifunctional centralized control valve 42 is arranged on the ash chamber 33; an upper air outlet of the multifunctional centralized control valve is communicated with an annular air flue 30 through an air duct; a lower air outlet points to the bottom of the ash chamber 33. Thus, the carbon conversion rate of residual carbon in the carbon residue can be effectively improved. In addition, an insulated hearth 81 is arranged on the oxygen-enriched combustion chamber 20; a first heat energy collector 18 is arranged inside the hearth 81; a water dust scrubber 75 is arranged on an exhaust port 7 of the hearth 81; an induced draft fan 76 is arranged on the water dust scrubber 75. In addition, the other parts are the same as those in the [embodiment 10].

A high-efficiency clean burning method of a macromolecular substance adopted by the embodiment, shown in the FIG. 13, the FIG. 15 and the FIG. 17, compared with the [embodiment 10] in processing steps, comprises the differences as follows: the "preheating and drying the macromolecular substance and separating a part of water" in the step (2) are as follows: most of water contained in the macromolecular substance is directly discharged into the atmosphere after being subjected to decalescence gasification and separated from the material in the form of the water vapor in the embodiment; the "simultaneous heat recovery" in the step (4) just indicates simultaneously carrying out primary indirect heat recovery; a temperature curve of the pyrolysis or combustion product is shown in A-B'-C'-D-E1 in the FIG. 15; in addition, the other processing steps are the same as those in the [embodiment 10].

In conclusion, by adopting the high-efficiency clean burning method and device of the macromolecular substance disclosed by the invention, a combustion product which is higher than the melting point and lower than the formation temperature of the thermal $NO_x$, namely greater than 800 DEG C. and smaller than 1500 DEG C. is generated by using anoxic combustion; the combustion product comprises fly ashes and various gaseous substances. Thus, on one hand, the fly ashes form slag and are separated from the combustion product; on the other hand, the thermal $NO_x$ also can be effectively avoided; meanwhile, the fuel $NO_x$ which may be generated in material combustion can be restored into nontoxic harmless $N_2$ under high-temperature reduction action of the red-hot carbon residue, thereby effectively avoiding a lot of fly ashes and $NO_x$;

meanwhile, a pyrolysis gas containing tar macromolecular gaseous substances accumulated at the lower part of the storage bucket 10 is led to a red-hot carbon residue layer above 850 DEG C.; the red-hot carbon residue is taken as a pyrolysis catalyst, so as to finish oxygen catalytic cracking of the red-hot carbon residue under an anaerobic environment, so that all tar macromolecular gaseous substances are converted into micromolecular combustible gases and organic micromolecular free radicals; then the obtained micromolecular combustible gas and organic micromolecular free radicals are completely led into the oxygen-enriched combustion chamber 20 to carry out oxygen-enriched combustion in a heat preservation manner. All combustible gases entering the oxygen-enriched combustion chamber 20 are the micromolecular combustible gases or the organic micromolecular free radicals; oxidation combustion reaction can be directly carried out together with oxygen radicals inside the oxygen-enriched combustion chamber 20 in absence of secondary pyrolysis of the tar macromolecular gaseous substances, so that complete combustion is easily achieved under the oxygen-enriched condition. Thus, various secondary pollutions which may exist in the gasification combustion utilization process in the prior art are effectively avoided.

In addition, the water vapor separation discharge device 15 led to the atmosphere and/or the oxygen-enriched combustion chamber 20 is arranged on the drying chamber 6 disclosed by the invention, so that, on one hand, negative impact of the pyrolysis gasification reaction temperature of the water vapor on the pyrolysis gas in the pyrolysis chamber 3 and the oxygen catalytic cracking reaction temperature of the anoxic combustion chamber 1 is effectively avoided, and the situation that the pyrolysis chamber 3 and the anoxic combustion chamber 1 stably run at the preset reaction temperature all the time is ensured; on the other hand, the mixed water vapor is led to the oxygen-enriched combustion chamber 20 through the water vapor separation discharge device 15, and the temperature of an oxygen-enriched combustion product also can be effectively reduced, so that the temperature of the final combustion product is controlled above the melting points of the fly ashes and below the generation temperature of the thermal $NO_x$, thereby effectively avoiding a lot of fly ashes and $NO_x$ again. Meanwhile, a controllable operation on the speed of the pyrolysis gas containing the tar gaseous macromolecular substances, which reversely flows through the red-hot carbon residue layer of the anoxic combustion chamber 1 is achieved by reasonable control of the water vapor separation discharge device 15, so that the standing time of the tar gaseous macromolecular substances inside the red-hot carbon residue layer can be effectively prolonged, complete pyrolysis is ensured, and a material guarantee is supplied for subsequent complete oxygen-enriched combustion of the combustible gas. In addition, "gasification burning" disclosed by the invention is ready-to-use after production at low pressure or normal pressure, so that the operation is very safe. Meanwhile, all the reactions are finished inside the same furnace, so that the operation technology is simplified, and the construction cost of equipment is reduced. Compared with the prior art, the device has obvious comparable economical efficiency.

Finally, special descriptions are as follows: what is said above is just a part of concrete implement schemes disclosed by the invention, but there are a plurality of other concrete implement schemes to achieve the invention, which may be obvious as to common technical personnel in the professional scope, but limited by the length, the implement schemes are not completely listed in the description. For example, a dual-furnace head or multi-furnace head structure also can be arranged at the outer side of the circumference of the inner furnace body 9 in the embodiments shown in the FIG. 1, the FIG. 2 and the FIG. 3, so as to adapt to actual requirements of different users. Meanwhile, the dust removal camber 28 also can be designed into a plurality of structural forms such as a cyclone dust chamber, an inertial dust chamber, a dry electrostatic dust chamber or combination thereof and the like besides adopting a gravity sedimentation chamber. The water jacket of the dust removal chamber also can be designed into an air-cooled warm air furnace structure in the embodiments shown in the FIG. 6, the FIG. 8, the FIG. 9 and the FIG. 10, so that a fresh air from the blast blower and/or an indoor circulating air from the induced draft fan flow from top to bottom in a spiral manner inside the water jacket 53, a warm air is finally formed to directly blow into the chamber, so as to adapt to the requirements of indoor heating in a cold region in winter. The device also can be applied to various energy utilization fields such as heating of greenhouse vegetables, industrial baking and the like. The inner furnace body 9 of the device also can be changed into a cuboid structure from a round structure in the embodiment shown in the FIG. 10, so as to improve the waste incineration disposal capacity and the generating capacity to the maximal extent in the power generation process employing waste incineration. The pneumatic valve 59 also can adopt an electromagnetic valve or other forms of electric valves; the feeder 72 also can be designed into a plurality of structural forms such as a screw propulsion form, a pneumatic propulsion form, a water pressure propulsion form, a hydraulic pressure propulsion form, a spring energy-storage propulsion form, a manual propulsion form, an erector propulsion form, a combined screw feeding form and the like in the embodiments shown in the FIG. 11 and the FIG. 12. The feeding hopper 62 of the feeding switch 79 also can be removed in the embodiment shown in the FIG. 13, so that the feeding hole forms an opening structure, so as to adapt to combustible materials with different lengths and sizes. In addition, various devices disclosed by the invention also can be designed into a plurality of structural forms such as home use, commercial application, industrial application and the like according to the specific circumstances of users. Therefore, various concrete implement schemes which do not violate the general concept of the invention, including other various deformed schemes or equivalent alternate schemes are effective protection schemes of the invention.

I claim:

1. A high-efficiency clean burning method of a macromolecular substance, characterized in that the method comprises the steps of:
   (1), adding a certain amount of biomass carbon residue to a first combustion air to carry out anoxic combustion below the theoretical oxygen demand, so as to generate a first gaseous substance, fly ashes and a carbon residue layer, wherein the first gaseous substance mainly comprises carbon monoxide, hydrogen and nitrogen; the first gaseous substance and the fly ashes are in an electronic excited state;
   (2), leading the heat generated by anoxic combustion to the macromolecular substance, preheating and drying the macromolecular substance, separating a part of water to increase the reaction temperature and promote pyrolysis gasification, so as to generate a second gaseous substance and carbon residue, wherein the second gaseous substance comprises "dioxin" and/or other "tar" macromolecular substances, a part of micromolecular combustible gas and a small amount of water vapor;
   (3), taking carbon residue of the carbon residue layer as a pyrolysis catalyst, leading the second gaseous substance to the red-hot carbon residue layer to carry out oxygen catalytic cracking, so as to generate a third gaseous substance and fly ashes, wherein the third gaseous substance does not contain "dioxin" and/or other "tar" macromolecular substances, but contains a certain amount of micromolecular hydrocarbon, carbon monoxide, hydrogen, nitrogen and a part of organic micromolecular free radicals; the third gaseous substance and the fly ashes are in the electronic excited state;
   (4), merging and mixing the third gaseous substance and the fly ashes in the electronic excited state in the step (3) with the first gaseous substance and the fly ashes in the step (1), and leading into an oxygen-enriched combustion zone in a heat preservation manner; adding a second combustion air above the theoretical oxygen demand to carry out oxygen-enriched combustion or simultaneously carry out heat recovery; or merging and mixing the third gaseous substance and the fly ashes in the step (3) with the first gaseous substance and the fly ashes in the step (1), leading into the oxygen-enriched combustion zone in the heat preservation manner after dust removal in the heat preservation manner, adding the second combustion air above the theoretical oxygen demand to carry out oxygen-enriched combustion or simultaneously carry out heat recovery, so as to control the temperature of a combustion product above melting points of the fly ashes, or control the temperature of the combustion product above the melting points of the fly ashes and below the generation temperature of a thermal nitrogen oxides $NO_x$, thereby generating a slag and a fourth gaseous substance, wherein the fourth gaseous substance is also in the electronic excited state;
   the first gaseous substance and the third gaseous substance are completely burnt;
   (5), directly discharging the fourth gaseous substance into the atmosphere or discharging the fourth gaseous substance into the atmosphere after washing and purifying and/or heat recovery.

2. The high-efficiency clean burning method of the macromolecular substance according to claim 1, characterized in that "preheating and drying the macromolecular substance and separating a part of water" in the step (2) are as follows:
   most of water contained in the macromolecular substance is directly discharged into the atmosphere after being subjected to decalescence gasification and separated from a material in a form of water vapor;
   or vaporized water mixed with the micromolecular combustible gas is led into the oxygen-enriched combustion zone in the step (4) after being separated from the material in the form of the water vapor, so as to achieve decalescence cooling and automatic separation of the water vapor and instant complete combustion of the micromolecular combustible gas;
   or the vaporized water mixed with the micromolecular combustible gas is led into the oxygen-enriched combustion zone in the step (4) after being separated from the material in the form of the water vapor and fully premixed with a third combustion air above the theoretical oxygen demand, so as to achieve gas conversion and decalescence cooling of the water vapor and instant complete combustion of the micromolecular combustible gas;
   or the vaporized water mixed with the micromolecular combustible gas is fully premixed with the third combustion air above the theoretical oxygen demand after being separated from the material in the form of the water vapor, and condensed, liquefied and automatically separated by the water vapor, and then led into the oxygen-enriched combustion zone in the step (4), so as to achieve gas conversion and decalescence cooling of a small amount of water vapor, and instant complete combustion of the micromolecular combustible gas.

3. The high-efficiency clean burning method of the macromolecular substance according to claim 1, characterized in that the situation that "the third gaseous substance does not contain 'dioxin' and other 'tar' macromolecular substances" in the step (3) is achieved by controlling the temperature of the carbon residue layer and the standing time of the second gaseous substance in the carbon residue layer, or controlling the amount of the first combustion air, the effective thickness of the carbon residue layer and the moisture content of the second gaseous substance; the effective thickness of the carbon residue layer is the carbon residue thickness of which the second gaseous substance actually flows inside the carbon residue layer; meanwhile, the "dioxin" in the step (2) or the step (3) comprises "dioxin" and a precursor thereof;
   the situation that "the first gaseous substance and the third gaseous substance are completely burnt" in the step (4) is achieved by controlling the supply of the second combustion air, namely an excess air coefficient of the second combustion air and the mixing degree of the first gaseous substance, the third gaseous substance and the second combustion air; meanwhile, the "heat recovery" in the step (4) is direct heat recovery of filling mixed water vapor to the oxygen-enriched combustion zone and/or indirect heat recovery carried out by virtue of a dividing wall-type heat exchanger;
   the "water" in "washing and purifying" in the step (5) comprises common running water, an acid aqueous solution, an alkaline solution or a saline solution.

4. The high-efficiency clean burning method of the macromolecular substance according to claim 3, characterized in that the temperature of the carbon residue layer is greater than or equal to 850 DEG C.

5. The high-efficiency clean burning method of the macromolecular substance according to claim 1, characterized in that the temperature of the carbon residue layer is greater than or equal to 850 DEG C.

6. A high-efficiency clean burning device of a macromolecular substance for achieving the method according to claim 1, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device and a primary combustion product outlet are arranged on the anoxic combustion chamber; a dust removal chamber is arranged at the primary combustion product outlet; the oxygen-enriched combustion chamber is arranged on the dust removal chamber; a secondary oxygen supply device is arranged on a gas circuit from the primary combustion product outlet to the oxygen-enriched combustion chamber; an ash chamber is arranged below the anoxic combustion chamber; a heat energy collector is arranged inside the oxygen-enriched combustion chamber and/or on the oxygen-enriched combustion chamber;
the pyrolysis chamber and the drying chamber are sequentially arranged above the anoxic combustion chamber; thermal-insulating layers are arranged at the peripheries of the outer sides of the dust removal chamber, the anoxic combustion chamber, the pyrolysis chamber and the drying chamber.

7. A high-efficiency clean burning device of the macromolecular substance for achieving the method according to claim 1, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device is arranged on the anoxic combustion chamber; a grid melter, a primary combustion product outlet, the oxygen-enriched combustion chamber and an ash chamber are sequentially arranged below the anoxic combustion chamber; a secondary combustion product outlet is formed on the oxygen-enriched combustion chamber; meanwhile, a secondary oxygen supply device is arranged on the grid melter and/or a gas circuit from the primary combustion product outlet to the oxygen-enriched combustion chamber; the pyrolysis chamber and the drying chamber are sequentially arranged above the anoxic combustion chamber; the drying chamber, the pyrolysis chamber, the anoxic combustion chamber, the oxygen-enriched combustion chamber and the ash chamber are communicated; thermal-insulating layers are arranged at the peripheries of the outer sides of the drying chamber, the pyrolysis chamber, the anoxic combustion chamber, the oxygen-enriched combustion chamber and the ash chamber; or meanwhile, heat energy collectors are arranged at one or more parts "on the drying chamber, the pyrolysis chamber, the anoxic combustion chamber, the oxygen-enriched combustion chamber and the ash chamber and inside the oxygen-enriched combustion chamber and on the secondary combustion product outlet".

8. A high-efficiency clean burning device of the macromolecular substance for achieving the method according to claim 1, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device is arranged on the anoxic combustion chamber; a grid melter, a primary combustion product outlet, the oxygen-enriched combustion chamber and a washing dust chamber are sequentially arranged below the anoxic combustion chamber; a secondary combustion product outlet is formed on the oxygen-enriched combustion chamber; the secondary combustion product outlet is arranged below the liquid level of the washing dust chamber; meanwhile, a secondary oxygen supply device is arranged on the grid melter and/or a gas circuit from the primary combustion product outlet to the oxygen-enriched combustion chamber; the pyrolysis chamber and the drying chamber are sequentially arranged above the anoxic combustion chamber; the drying chamber, the pyrolysis chamber, the anoxic combustion chamber, the oxygen-enriched combustion chamber and the washing dust chamber are communicated; thermal-insulating layers are arranged at the peripheries of the outer sides of the drying chamber, the pyrolysis chamber, the anoxic combustion chamber and the oxygen-enriched combustion chamber; meanwhile, a mixed water vapor outlet is formed on the washing dust chamber; a scrubber tower is arranged on the mixed water vapor outlet; heat energy collectors are arranged at one or more parts on the scrubber tower, the drying chamber, the pyrolysis chamber, the anoxic combustion chamber and the oxygen-enriched combustion chamber and inside the oxygen-enriched combustion chamber.

9. A high-efficiency clean burning device of the macromolecular substance for achieving the method according to claim 1, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that a primary oxygen supply device is arranged on the anoxic combustion chamber; a primary combustion product outlet and the oxygen-enriched combustion chamber are sequentially arranged above the anoxic combustion chamber; a secondary oxygen supply device is arranged on the primary combustion product outlet and/or a gas circuit from the primary combustion product outlet to the oxygen-enriched combustion chamber; the pyrolysis chamber, the drying chamber and a feeder are sequentially arranged below the anoxic combustion chamber; the oxygen-enriched combustion chamber, the anoxic combustion chamber, the pyrolysis chamber and the drying chamber are communicated; heat energy collectors arranged at one part on the drying chamber, the pyrolysis chamber, the anoxic combustion chamber and the oxygen-enriched combustion chamber and inside the oxygen-enriched combustion chamber; thermal-insulating layers are arranged at the peripheries of the outer sides of the anoxic combustion chamber, the pyrolysis chamber and the drying chamber.

10. A high-efficiency clean burning device of the macromolecular substance for achieving the method according to claim 1, comprising an oxygen-enriched combustion chamber, an anoxic combustion chamber, a pyrolysis chamber and a drying chamber, wherein a water vapor separation discharge device led to the atmosphere and/or the oxygen-enriched combustion chamber is arranged on the drying chamber; the device is characterized in that the anoxic combustion chamber is a slant combustion chamber; a primary oxygen supply device is arranged on the slant combustion chamber; a primary combustion product outlet and the oxygen-enriched combustion chamber are sequentially arranged above the slant combustion chamber; a secondary oxygen supply device is arranged at the primary combustion product outlet; the pyrolysis chamber, the drying chamber and a feeder are sequentially arranged at one side which is horizontally opposite to the upper surface of an oblique base plate of the slant combustion chamber; the oxygen-enriched combustion chamber, the anoxic combustion chamber, the pyrolysis chamber and the drying chamber are communicated; heat energy collectors arranged at one part on the drying chamber, the pyrolysis chamber, the anoxic combustion chamber and the oxygen-enriched combustion chamber and inside the oxygen-enriched combustion chamber; thermal-insulating layers are arranged at the peripheries of the outer sides of the anoxic combustion chamber, the pyrolysis chamber and the drying chamber.

* * * * *